(12) United States Patent
Amir et al.

(10) Patent No.: US 8,437,267 B2
(45) Date of Patent: May 7, 2013

(54) SYSTEM AND METHOD FOR RECOVERY OF PACKETS IN OVERLAY NETWORKS

(75) Inventors: Yair Amir, Bethesda, MD (US); Jonathan Stanton, Chevy Chase, MD (US); John William Lane, Baltimore, MD (US); John Lane Schultz, Lutherville, MD (US)

(73) Assignee: LTN GLOBAL Communications, Inc., Savage, MD (US)

( * ) Notice: Subject to any disclaimer, the term of this patent is extended or adjusted under 35 U.S.C. 154(b) by 347 days.

(21) Appl. No.: 12/644,796

(22) Filed: Dec. 22, 2009

(65) Prior Publication Data

US 2010/0165830 A1  Jul. 1, 2010

Related U.S. Application Data

(60) Provisional application No. 61/140,065, filed on Dec. 22, 2008.

(51) Int. Cl.
*G08C 15/00* (2006.01)
*G06C 25/02* (2006.01)

(52) U.S. Cl.
USPC ............................. 370/252; 370/389; 714/748

(58) Field of Classification Search .................. None
See application file for complete search history.

(56) References Cited

U.S. PATENT DOCUMENTS

| | | | |
|---|---|---|---|
| 4,672,543 A | 6/1987 | Matsui et al. | |
| 5,664,091 A * | 9/1997 | Keen | 714/748 |
| 6,467,008 B1 | 10/2002 | Gentry, Jr. et al. | |
| 6,493,316 B1 | 12/2002 | Chapman et al. | |
| 6,694,469 B1 * | 2/2004 | Jalali et al. | 714/748 |
| 6,901,445 B2 | 5/2005 | McCanne et al. | |
| 7,042,869 B1 * | 5/2006 | Bender | 370/349 |
| 7,206,280 B1 * | 4/2007 | Khan et al. | 370/216 |
| 7,567,515 B2 * | 7/2009 | Shen | 370/236 |
| 7,761,767 B2 * | 7/2010 | Chandra et al. | 714/751 |
| 2002/0064167 A1 * | 5/2002 | Khan et al. | 370/410 |
| 2003/0147371 A1 * | 8/2003 | Choi et al. | 370/341 |

(Continued)

OTHER PUBLICATIONS

Amir et al. 1-800-Overlays: Using Overlay Networks to Improve VoIP Quality. NOSSDAV. 2005. pp. 51-56.*

(Continued)

*Primary Examiner* — Steven H Nguyen
(74) *Attorney, Agent, or Firm* — Venable LLP; Robert S. Babayi

(57) ABSTRACT

The present invention relates to a packet recovery method for packets communicated between sender and receiver nodes of an overlay network that runs over an underlying IP network. The present invention executes a packet recovery process at a receiver node upon satisfaction of a packet recovery condition that is associated with meeting a deadline driven criteria for a transmitted packet. The packet recovery process associates N number of scheduled times with N requests for retransmission of the transmitted packet. At least one of the N scheduled times includes a receiver waiting time. At each N scheduled time, a request for retransmission of the transmitted packet is transmitted to a source node. A packet retransmission process at the sender node is executed upon the first receipt of a request for retransmission of the transmitted packet. In one embodiment, the packet retransmission process retransmits the transmitted packet to the receiver node at M number of scheduled times, where the N and M are non-zero positive integers and at least one of the N or M number of scheduled times is greater than one.

78 Claims, 11 Drawing Sheets

U.S. PATENT DOCUMENTS

2005/0058149 A1 3/2005 Howe
2006/0268871 A1 11/2006 Van Zijst
2007/0168825 A1* 7/2007 Jalali et al. .................... 714/748
2007/0223495 A1* 9/2007 Fukui ....................... 370/395.64
2008/0209297 A1* 8/2008 Chandra et al. ............... 714/748

OTHER PUBLICATIONS

International Search Report of International Application No. PCT/US2009/069238.

\* cited by examiner

SYSTEM AND METHOD FOR RECOVERY OF PACKETS IN OVERLAY NETWORKS

RELATED APPLICATIONS

This non-provisional application incorporates by reference the following provisional applications in their entirety: U.S. Provisional Application No. 61/140,065, filed on Dec. 22, 2008; U.S. Non-provisional application Ser. No. 12/506,725, filed on Jul. 21, 2009, U.S. Non-provisional application Ser. No. 12/537,582, filed on Aug. 7, 2009; Provisional Application Ser. No. 61/082,270, filed Jul. 21, 2008; Provisional Application Ser. No. 61/086,987, filed Aug. 7, 2008; Provisional Application Ser. No. 61/664,459, filed Apr. 3, 2009.

FIELD OF THE INVENTION

The present invention generally relates to the field of network systems and more particularly to protocols and systems for the recovery of transmitted packets in such networks.

BACKGROUND OF THE INVENTION

An overlay network is a computer network that is built on top of another network. Nodes in the overlay can be thought of as being connected by virtual or logical links, each of which corresponds to a path, perhaps through many physical links, in the underlying network. An overlay network can implement different types of protocols at the logical level, including protocols materially different from those implemented at the physical level. The concept of overlay networks is often viewed to include many different systems such as P2P or dial-up modems over the telephone network. Usually, the usage of overlay networks may come with a price, for example, in added latency that is incurred due to longer paths created by overlay routing, and by the need to process the messages in the application level by every overlay node on the path.

A particular class of overlay networks is Message-Oriented Overlay Network (MOON). MOON is a specific type of overlay network that maintains control and management over the overlay nodes based on communicated messages. MOON provides network services that manipulate the messages which pass through the overlay network to improve the reliability, latency, jitter, routing, or other network properties, or to add new network capabilities and services. One example of MOON is implemented as the Spines system (www.spines.org), which is available as open source, including messaging services similar to those provided at the Internet level such as reliable and unreliable unicast, but with lower latency. It also includes services not practically available at the Internet level such as soft real time unicast and semi-reliable multicast. The Spines system supports multiple flows over a single overlay network, each of which with its own set of senders and receiver nodes.

Resilient Overlay Network (RON) (available at http://nms.csail.mit.edu/ron/) is another example of MOON as disclosed in "Resilient Overlay Networks" by David G. Andersen, Hari Balakrishnan, M. Frans Kaashoek and Robert Morris in Proceedings of the ACM SOSP, 2001. RON provides better connectivity (more resilient routing) by continuously monitoring each overlay site. If there is direct connectivity on the underlying network (the Internet in the case of RON) then the message is sent directly using a single overlay hop. Otherwise, RON uses two overlay hops to pass messages between overlay sites that are not connected directly by the Internet, thus providing better connectivity between sites than connectivity achieved by the native Internet.

In "Reliable Communication in Overlay Networks", Yair Amir and Claudiu Danilov., in the Proceedings of the IEEE International Conference on Dependable Systems and Networks (DSN03), San Francisco, June 2003, which is hereby incorporated by reference in its entirety, (Yair Amir, a co-author of the paper and co-inventor of the instant application), describe a MOON that uses hop-by-hop reliability to reduce overlay routing overhead and achieves better performance than standard end-to-end TCP connections deployed on the same overlay network. More specifically, in the disclosed MOON, intermediate overlay nodes handle reliability and congestion control only for the links to their immediate neighbors and do not keep any state for individual flows in the system. Packets are forwarded and acknowledged per link, regardless of their originator. This implementation of MOON recovers the losses only on the overlay hop on which they occurred, localizing the congestion and enabling faster recovery. Since an overlay link has a lower delay compared to an end-to-end connection that traverses multiple hops, the losses can be detected faster and the missed packet can be resent locally. Moreover, the congestion control on the overlay link can increase the congestion window back faster than an end-to-end connection, as it has a smaller round-trip time. Hop-by-hop reliability involves buffers and processing in the intermediate overlay nodes. The overlay nodes deploy a reliable protocol, and keep track of packets, acknowledgments and congestion control, in addition to their regular routing functionality, thereby allowing for identification of congestions in the overlay network level.

In "An Overlay Architecture for High Quality VoIP Streams", Yair Amir, Claudiu Danilov, Stuart Goose, David Hedqvist, Andreas Terzis, in the IEEE Transactions on Multimedia, 8(6), pages 1250-1262, December 2006, (referred to as [ADGHT06]) which is hereby incorporated by reference in its entirety, algorithms and protocols are disclosed that implement localized packet loss recovery between a source node and a sender node and rapid rerouting in the event of network failures in order to improve performance in VoIP applications that use UDP to transfer data. The disclosed packet loss recovery detects out of order arrival of sequenced packets at the receiver node. Upon detection, the receiver node immediately transmits to the sender node a single request for retransmission of the packet(s) that based on the out of order arrival, are suspected as being lost. Upon receiving the request for retransmission, the sender node immediately retransmits the requested transmitted packets. The algorithms are deployed on the routers of an application-level overlay network and have shown to yield voice quality on par with the PSTN. Similar ideas were expressed in "1-800-*OVERLAYS: Using Overlay Networks to improve VoIP quality*" with the same authors in the Proceedings of the International Workshop on Network and Operating Systems Support for Digital Audio and Video (NOSSDAV) pages 51-56, Skamania, Wash., 2005 (referred to as [ADGHT05]).

Overlay networks are being used for reliable real-time or near real time delivery of large amounts of data, such as Standard Definition (SD) and High Definition (HD) video data as well as live and interactive video and online gaming, among other applications. Various routing schemes for delivery of end-to-end information and data over an overlay networks are known. They include broadcast, multicast, unicast and anycast. For example, broadcasting refers to transmitting an information packet to every node on the overlay network and unicasting refers to transmitting packets to a single receiver node. Multicast is a protocol for the delivery of information to a group of destinations simultaneously over the overlay network.

Reliable point-to-point communication is one of the main utilizations of the Internet, where over the last few decades TCP has served as the dominant protocol. Developers often use TCP connections to realize reliable point-to-point communication in distributed systems. Over the Internet, reliable communication is performed end-to-end in order to address the severe scalability and interoperability requirements of a network in which potentially every computer on the planet could participate. Thus, all the work required in a reliable connection is distributed only to the two end nodes of that connection, while intermediate nodes route packets without keeping any information about the individual packets they transfer.

Many mechanisms for increasing the reliability of packet transmissions are known. They can generally be characterized as protocols that require either additional latency or bandwidth in exchange for reliability. Protocols that increase latency are most commonly retransmission protocols involving a sender node and a receiver node, where either the receiver node sends a retransmission request to the sender upon determination of loss of one or more packets and, or the sender node fails to receive a positive acknowledgment from the receiver and retransmits one or more transmitted packets. Retransmissions of transmitted packets, however, use additional bandwidth when a transmitted packet loss is indicated. Thus, conventional packet recovery protocols incur additional latency because the lost packets could not be delivered until packet losses are first detected, requests for retransmissions of the lost packets are sent, and the retransmission of the packets are received.

Forward Error Correction (FEC) is another known method for packet recovery where the sender node adds redundant information, known as an error-correction code, to transmitted packets. This allows the receiver node to detect and correct errors (within some bound) without the need to ask the sender node for additional data. The advantages of forward error correction are that a feed back channel is not required and retransmission of data can often be avoided at the cost of higher bandwidth requirements, on average. For this reason, FEC is usually applied in situations where retransmissions are relatively costly or impossible. However, FEC requires additional bandwidth for sending the redundant information at the time of original transmission (or later) to enable the receiver node to reconstruct the transmitted packets even when portions or entire transmitted packets are lost.

One type of FEC uses erasure codes to divide the transmitted packets into a number of blocks. If a specified fraction of these packets arrive at the receiver node, then the received packets can be decoded to reconstruct the originally transmitted packets. The bandwidth overhead of FEC depends on the specific codes used and certain parameters that specify a level of redundant data and a threshold for decoding the original message. Another type of redundant data transmission is sending packets over multiple non-overlapping network paths. Then, if a packet is lost on one path, it may arrive on another path.

Many applications require packets to be received in a timely manner. These include, but are not limited to, voice over IP, streaming video, interactive streaming media, and networked games. Real-time delivery of messages requires meeting very strict deadlines. Real-time messages must be delivered to an end receiver node before the data needs to be displayed, played, or acted upon, which imposes an end-to-end deadline for message delivery. The end-to-end deadline, in turn, imposes a deadline for packet transmission across each hop (i.e. link) in a message's path. In a deadline driven packet delivery model, a transmitted packet would be equivalent to a lost packet if it arrives at its destination after a required temporal deadline. Packets transmitted over network links may be lost because of signal corruption in transit, congestion along the link, or buffer overflows in queues along the path.

Therefore, there exists a need for a system and a method that efficiently use resources to increase the probability of messages arriving at receiver nodes on time, while providing the flexibility of balancing reliability relative to bandwidth and CPU cost.

SUMMARY

The present invention relates to a packet recovery method for packets communicated between a sender and a receiver nodes of an overlay network that runs over an underlying IP network. The present invention executes a packet recovery process at the receiver node upon satisfaction of a packet recovery condition that is associated with meeting a deadline driven criteria for a transmitted packet. The packet recovery process associates N number of scheduled times with N requests for retransmission of the transmitted packet. At least one of the N scheduled times includes a receiver waiting time. At each N scheduled time, a request for retransmission of the transmitted packet is transmitted to the source node.

A packet retransmission process at the sender node is executed upon the first receipt of a request for retransmission of the transmitted packet. In one embodiment, the packet retransmission process retransmits the transmitted packet to the receiver node at M number of scheduled times, where the N and M are non-zero positive integers and at least one of the N or M number of scheduled times is greater than one. In another embodiment, the packet retransmission process uses an erasure coding function, with integer parameter k greater than 1 and less than M, to generate M encoded blocks such that any k out of M encoded blocks are sufficient to recreate the transmitted packet at the receiver node and transmits the M encoded blocks to the receiver node at M scheduled times, where the N and M are non-zero positive integers and M is greater than 2. The M scheduled times are relative to the first receipt of the request for retransmission of the transmitted packet and at least one of the M scheduled times includes a sender waiting time.

The receiver and sender nodes can comprise adjacent overlay nodes. In another embodiment, the receiver and sender nodes can comprise an IP node of an IP network and an overlay node of an overlay network. In still another embodiment, the receiver and sender nodes can comprise a node and an Access Overlay Router that communicate with each other over a last mile transmission medium of an IP access network.

DETAILED DESCRIPTION OF THE INVENTION

Figure 1:
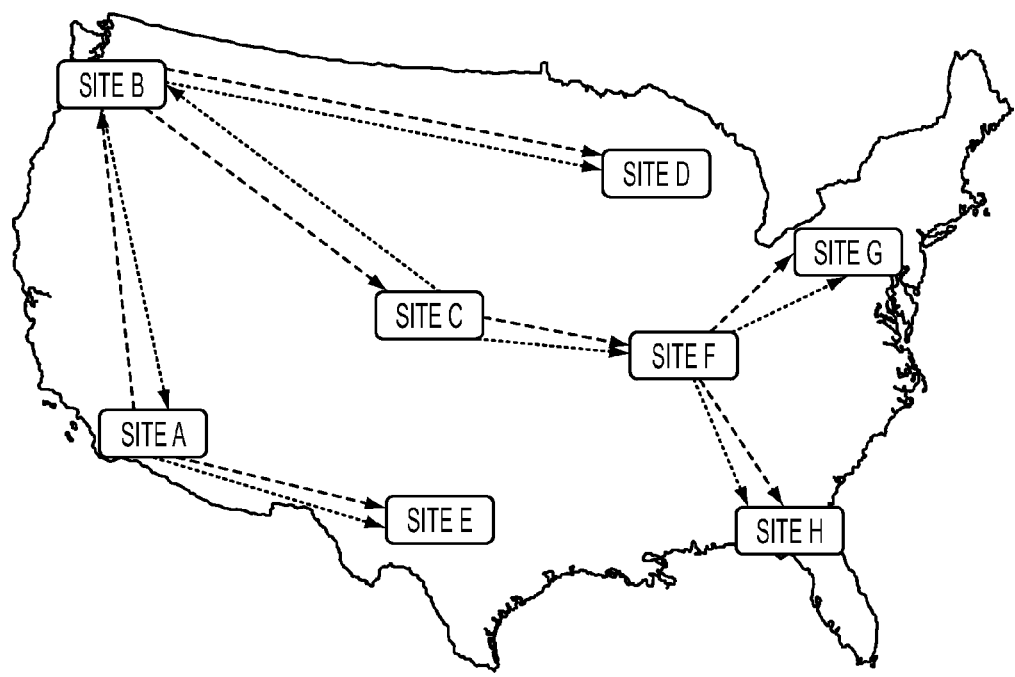
FIG. 1 shows locations of a number of sites with flows having the same receiving sites.

One embodiment of the present invention is implemented with application-level overlay networks comprising a plurality of parallel overlay networks that are applied over an underlying network of nodes, for example an IP network, such as the Internet. The present invention is described herein according to the following definitions:

DEFINITIONS

A process is an algorithm or method executed in a processing unit.

A state information is any information that a processes receives for performing a task or produces by performing a task.

A global state information is any state information that is shared with processes in more than one site.

A real-time process is a process that is executed to complete tasks before a specified deadline.

A processing unit is the basic unit of computation provided by a CPU that can execute independent JO and computation tasks. For example, in a multi-core CPU it would be a core, in a single-core CPU it would be the CPU itself Hardware threading, such as Intel Nehalem HyperThreads or Sun SPARC T2 hardware threads can be processing units.

A node comprises one or more processing units running processes that perform I/O functions for sending and/or receiving flows.

A flow is a series of related packets communicated amongst a sender node and one or more receiver node(s).

A live flow is a flow that reaches each receiver node within a defined delay budget.

A receiver node is a node that executes a process for receiving flows.

A sender node is a node that executes a process for sending flows.

A site comprises a location for a group of nodes that communicate with each other over an intra-site network, such as a local area network, and have access to an inter-site network, such as the Internet. In one embodiment, nodes are located at geographically dispersed sites.

An overlay node is a logical node that executes an overlay process.

An overlay process is a process that creates and maintains an overlay network and the flows within it according to an overlay protocol.

A shadow overlay process is a type of overlay process used to provide hot backup for a corresponding overlay process. The shadow overlay process executes the overlay protocol as if it were the corresponding overlay process when that overlay process fails.

A protocol is a set of conventions governing the treatment or the formatting of data in an electronic communications system, including a target delay time D within which packet deliveries are attempted.

An overlay protocol is a protocol for controlling flows between at least two overlay processes based on a defined policy that relates to connectivity, routing of flows and/or communicating messages in an overlay network. The overlay protocols in different overlay networks can be based on the same or different policies.

A logical link comprises a path formed along multiple physical links connecting the nodes of the underlying network.

An overlay network is a network of overlay processes executing on overlay nodes connected to each other by logical (or virtual) links in a computer network that is built on top of an underlying network of nodes.

A multicast network is a network that uses a multicast protocol that copies a flow from a sender node to a plurality of receiver nodes only in those interim nodes where a logical link to at least two receiver nodes splits.

An overlay multicast network is an overlay network that uses less than or equal network bandwidth to deliver the flows from a sender node to a plurality of receiver nodes than would be required if using only a unicast protocol between the source and each of the receiver nodes.

A message is any information that is communicated with a node. A message can be part of a flow or independent from it, such as a control message that is not part of a flow.

A Message Oriented Overlay Network (MOON) is a specific type of overlay network having overlay nodes that execute a MOON process. A MOON maintains control and management over the overlay nodes based on communicated messages. A MOON does not use persistent storage to store data messages during transit.

A MOON process is an overlay process that controls or otherwise manipulates messages passing through the overlay network to improve message service characteristics such as reliability, latency, jitter, recovery protocols, reordering, timing or other network properties, or to add new network capabilities or services. A MOON process stores messages during transit in system memory.

A transit router (TR) is a node that executes one or more overlay processes that create and maintain one or more overlay networks. One example of a TR is a server class computer that has one or more processing units. Another example is a dedicated routing device that runs software programs.

An access node (AN) is a node that executes AN processes using one or more processing units to receive flows and send flows to overlay nodes as well as delivering those flows to receiver nodes and ingesting those flows from sender nodes, which establish connections to the AN. One example of an AN is a server class computer.

A super node (SN) is a logical node made up of one or more transit routers in a single site that acts as an overlay node participant on parallel overlay networks.

Parallel overlay networks are a plurality of overlay networks such that each two overlay networks share the majority of sites they run on.

An operating system (OS) is a computer program executed in one or more processing units that is responsible for the management and coordination of activities and the sharing of resources. OS instances can be executed in different hardware, in different Virtual Machines, or both.

A group communication service (GCS) is a message service that provides Virtual Synchrony semantics, as disclosed by K. Birman and T. Joseph in "*Exploiting Virtual Synchrony*

*in Distributed Systems*", in Proceedings of the ACM Symposium on Operating Systems Principles, pages 123-138, November 1987, or one of its derivatives, such as Extended Virtual Synchrony, by L. E. Moser, Y. Amir, P. M. Melliar-Smith and D. A. Agrawal, "*Extended Virtual Synchrony*", in Proceedings of the IEEE International Conference on Distributed Computing Systems, pages 56-65, June 1994.

Access Overlay Router is a node that executes a process that bridge flows on an overlay network with flows on an IP network. The Access Overlay Router may have multiple network interfaces and may communicate on multiple IP networks as well as zero or more overlay networks.

Last mile transmission medium comprises a physical transmission mediums between a Network Service Provider (NSP) and subscriber premises. The NSP can be a wired, wireless, cable, satellite or fiber network service provider or an exchange carrier, such as Incumbent Local Exchange Carrier (ILEC) or a Competitive Local Exchange Carrier (CLEC).

System Overview

The system and method of the present invention reliably delivers large numbers of live or non-live flows (or streams) from any sender node to multiple receiver (or destination) nodes via a relatively small number of sites at locations in a large geographic area.

FIG. 1 shows the locations of a number of sites on the map of the United States. The sites can be located over areas in any continent, country, state or region. In one embodiment, the sites are located in geographically distinct locations with a specified budgeted delay, e.g., 100 ms. Each site has one or more connections to a public network such as the Internet, through connectivity provided by network service providers. One embodiment of the invention is implemented in two or more (e.g., three sites) ingress and egress sites for ingest, transport, and delivery of flows. Each flow is identifiable and can be a point-to-point flow from a sender node to a receiver node, a point-to-multi-point flow (e.g., a multicast flow from a sender node to multiple receiver nodes), or a multipoint-to-multipoint flow (e.g. an online game). In one embodiment, the present invention is a managed overlay network architecture that supports the transport and delivery of a large number of live flows from any source to any destination over any network, such as an IP network, on a global scale. The architecture allows a content provider to deliver live flows uniquely to a large number of receiver nodes only when a receiver node specifically requests it.

Various embodiments and aspects of the system and method of the present invention described herein provide highly reliable, low latency network services over the wide-area Internet. An exemplary network according to the present invention is implemented in a Flow Transport and Delivery Network (FTDN) described in U.S. Non-provisional application Ser. No. 12/506,725, titled "A SCALABLE FLOW TRANSPORT AND DELIVERY NETWORK AND ASSOCIATED METHODS AND SYSTEMS," which was filed on Jul. 21, 2009, and which is hereby incorporated by reference. This FTDN comprises parallel overly networks and is an intelligent, content-aware, highly scalable managed network designed to deliver high quality real-time flows over the Internet such as live video, TV channel and interactive games by supporting many concurrent flows. The FTDN is aware of all of the flows and the network by keeping and managing the state of every flow in a closely monitored manner. FTDN is also aware of the underlying network conditions allowing it to route around problematic links. Flows from any source can be delivered to any subset receivers, enabling segmented service. FTDN maintains end-to-end control over the flow and supports policy, cost and utilization based flow admission control.

The FTDN is scalable with the number of high capacity flows and with the number of sender nodes and receiver nodes (client nodes) as long as these nodes connect with one of the FTDN sites (preferably a site they can reach with low latency and good connectivity). Each flow can have multiple receiver nodes and each sender node can have multiple flows. The FTDN could be used to provide high-quality and real-time content, such as Standard Definition (SD) and/or High Definition (HD) video, online game support and other multimedia over the Internet for viewing or distribution to millions of users or subscribers.

Figure 2:
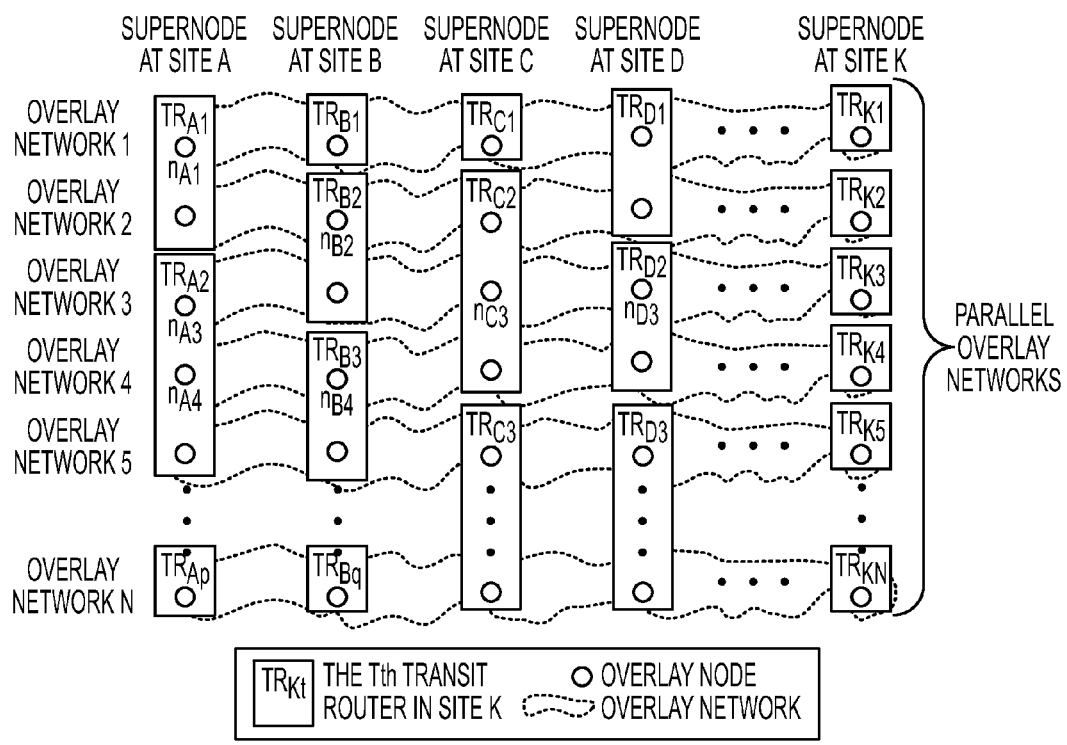
FIG. 2 shows a network architecture diagram of an FTDN according to one embodiment of the invention.

FIG. 2 shows a network architecture diagram of the FTDN that supports parallel overlay networks, shown as rows $ON_1$-$ON_N$, across a plurality of sites, shown as columns A, B, . . . , to K. The FTDN of FIG. 2 comprises a plurality of overlay nodes, $n_{A1}$-$n_{KN}$, at the intersection of each overlay network at each site. In one embodiment of the invention, overlay nodes $n_{A1}$-$n_{KN}$ execute corresponding overlay processes $P_{A1}$-$P_{KN}$ for scalable delivery of multiple flows, via the parallel overlay networks. The plurality of overlay processes can share network resources based on an a-priori known information without communicating with each other. The plurality of overlay processes can also be assigned to resources based on gathered information about link status, resource utilization or a parallel overlay networks' activity.

Any kind or number of parallel overlay networks, e.g., message oriented or non-message oriented, can be implemented over an underlying network. The parallel overlay networks can be the same or different overlay networks. An exemplary scalable message-oriented overlay network comprises a plurality of MOONs that execute MOON processes. Examples of specific overlay networks that could be used as the MOONs in the FTDN are Spines and RON mentioned above. The underlying network can be any type of public or private network, and can be an IP network or the Internet.

A super node contains one or more transit routers located at a site. A super node acts as an overlay node participant in different overlay networks of the parallel overlay networks. A transit router executes one or more overlay processes that create and maintain one or more overlay networks. As shown in FIG. 2, Site A has p transit routers, such that $TR_{A1}$ contains two overlay nodes, $TR_{A2}$ contains three overlay nodes, etc. Overall, there are N overlay nodes in Site A. On the other hand, Site C has 3 transit routers, namely, $TR_{C1}$, which comprises one overlay node, $TR_{C2}$, which comprises three overlay nodes, and $TR_{C3}$, which comprises the remaining overlay nodes for a total of N overlay nodes in the site. Site K has N transit routers, each of which comprises one overlay node.

Figure 3:
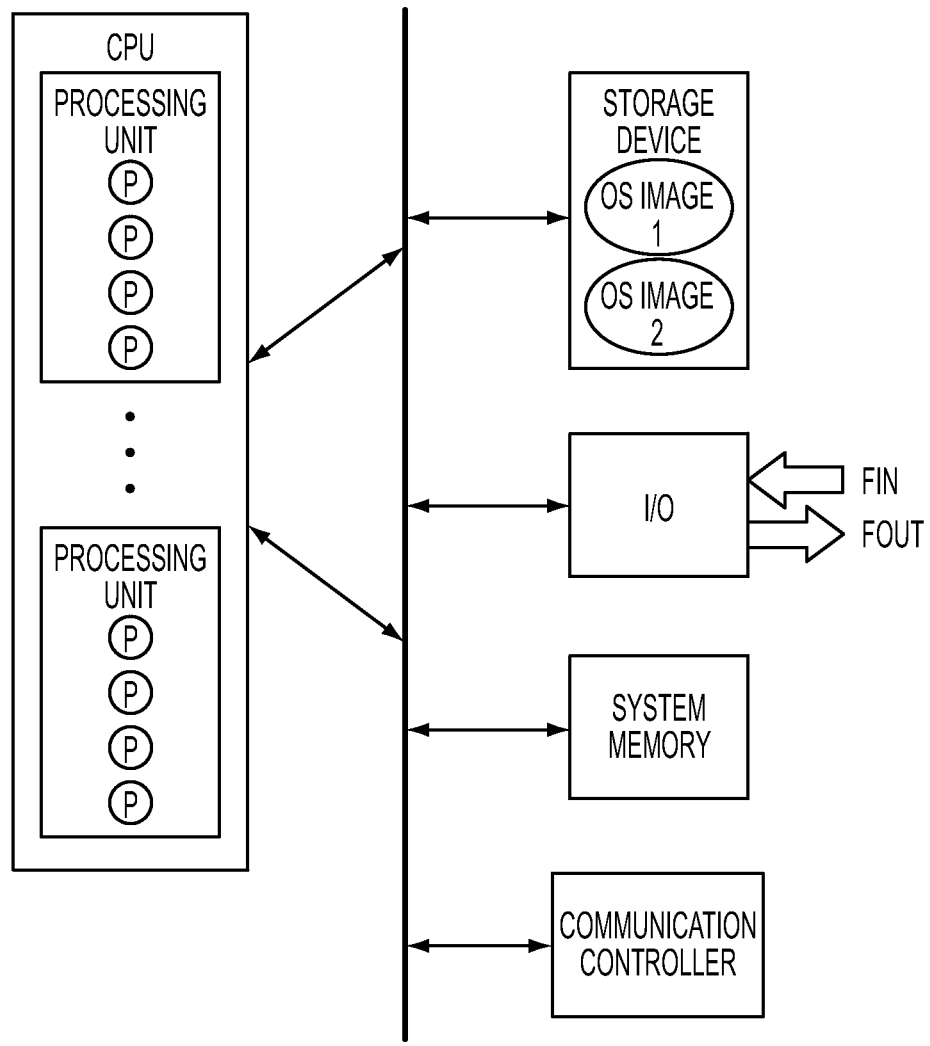
FIG. 3 shows a block diagram of a transit router.

FIG. 3 shows a block diagram of a transit router. The transit router comprises at least one CPU supporting one or more processing units, each executing one or more overlay processes P. The transit router can be implemented by a single core processing unit, a multi-core processing unit or otherwise by a single computer or multiple computers having one or more processing units for executing overlay processes. In one embodiment, the transit router has a volatile system memory and an I/O interface for receiving flows from other transit routers or access nodes, or transmitting flows to other transit router or access nodes and interfacing with other networks. In another embodiment the transit router also has a persistent storage device.

In one example, the transit router operates under the control of a single operating system, e.g., Linux. Alternatively, a number of operating systems, the same or different, e.g., Windows and Linux, or three Linux instances, execute within the transit router as virtual machines, some or all of which executing overlay processes. A communication controller passes various information amongst the overlay processes. One or more overlay processes are allocated to each transit router. Each overlay node is managed by its own process (daemon), thereby allow efficient utilization of multi-core, multi-processor modern computer architectures. This increases the throughput potential of the super node overall collection of overlay processes while allowing for relatively high average computation expense per message flowing through each overlay network without incurring harmful delay. The ability to expend relatively high computation expense per message going through the parallel overlay networks on every hop, enables the optimization of network performance for high throughput, high reliability and low latency. Examples include hop-by-hop recovery, coding, etc.

In one embodiment, each super node consists of one or more transit routers and one or more access nodes. Each access node receives flows from, and sends flows to, each overlay network through a transit router executing a process that maintains that overlay network. An access node delivers those flows to remote receiver nodes that establish connections to the access node. When a client node connects to an access node, a short handshaking protocol exchange establishes a shared state between the access node and the client node. This shared state includes what port numbers they are communicating on, flow control settings, available buffer space, choice of reliability protocol, and an identifier for the client session. The transit router and access node can be instantiated on a single machine or can be split among many machines, each separately performing the functions of a transit router, an access node, or both.

Figure 4:
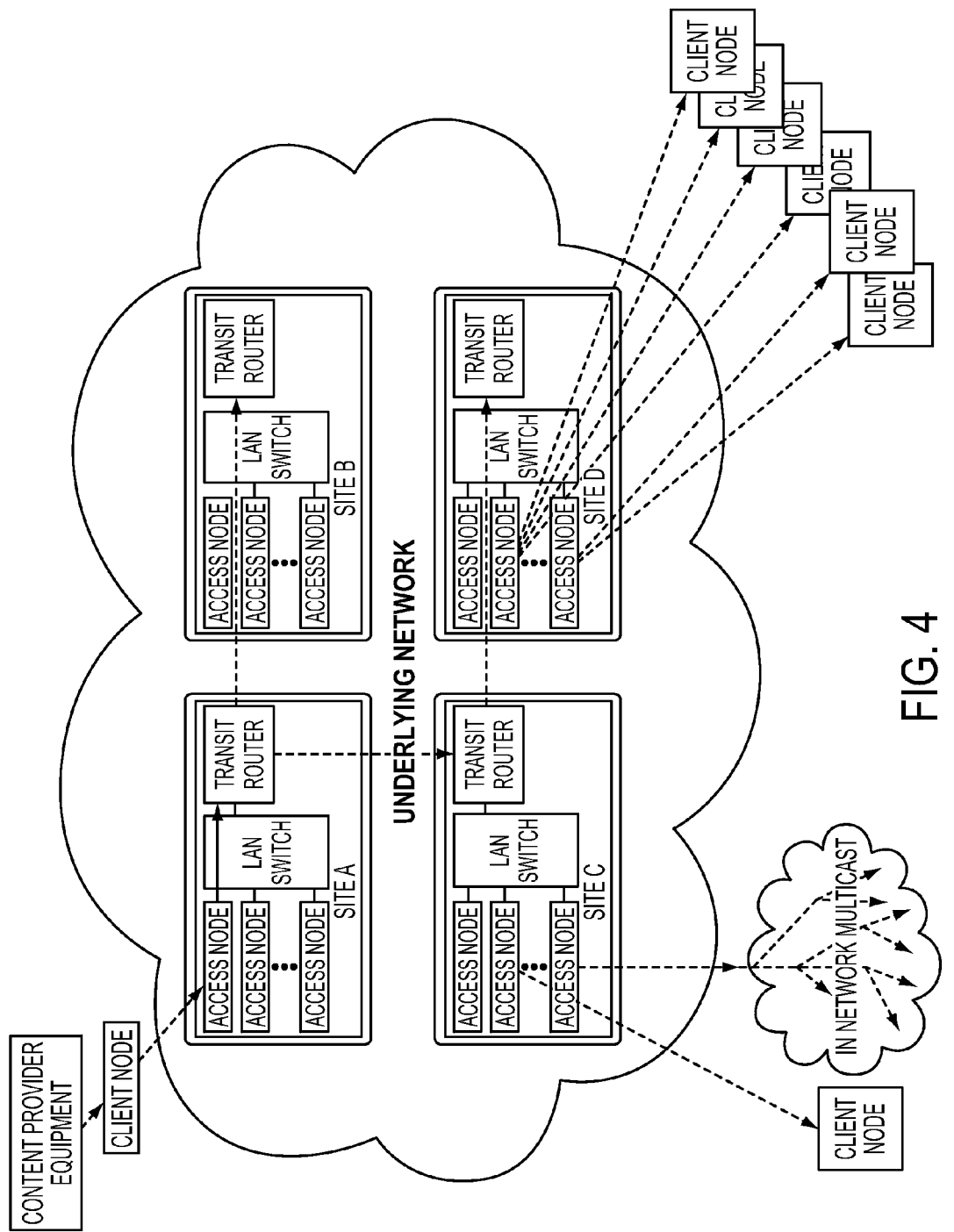
FIG. 4 shows the block diagram of plurality super nodes in corresponding sites.

FIG. 4 shows the block diagram of plurality super nodes in corresponding sites forming a backbone network for delivery of flows from one or more sender nodes (e.g., content providers) to one or more receiver nodes (e.g., clients). The transit routers have coordinating software between them that keeps state of every flow and does routing, resource assignment, network monitoring and admission control. Access nodes aggregate ingestion and delivery points and connect to transit routers communicating with each other, for example, via a multicast protocol over distributed nodes interconnected with IP clouds. In one embodiment, each transit router is an overlay multicast router that manages multicast flows not as IP-Multicast groups, or SSM sender identified groups, but rather as dynamic groups. Each transit router tracks each flow as a separate multicast group and forwards that flow onto additional transit router downstream according to the sender-based multicast routing tree computed by all of the nodes. In one embodiment, each group sender has its own optimal dissemination graph. The routes computed by each transit router is either the same or will become the same within a small window of time as each transit router calculates the routes based on link-state information provided by all of the other routers. This type of full route calculation is feasible because it is only carried out by the relatively small (e.g., thousand or less, and, in one embodiment, just 100 for a global world-wide coverage) number of super nodes, and not by all of the underlying Internet routers over which the flows may pass. In one embodiment, the transit router only forwards flows onto other transit routers that either have a local recipient of the flow (through an access node or direct client connection) or if that transit router is along the computed routing path between the current transit router and some other transit router who does have a local client node for the flow.

Figure 5:
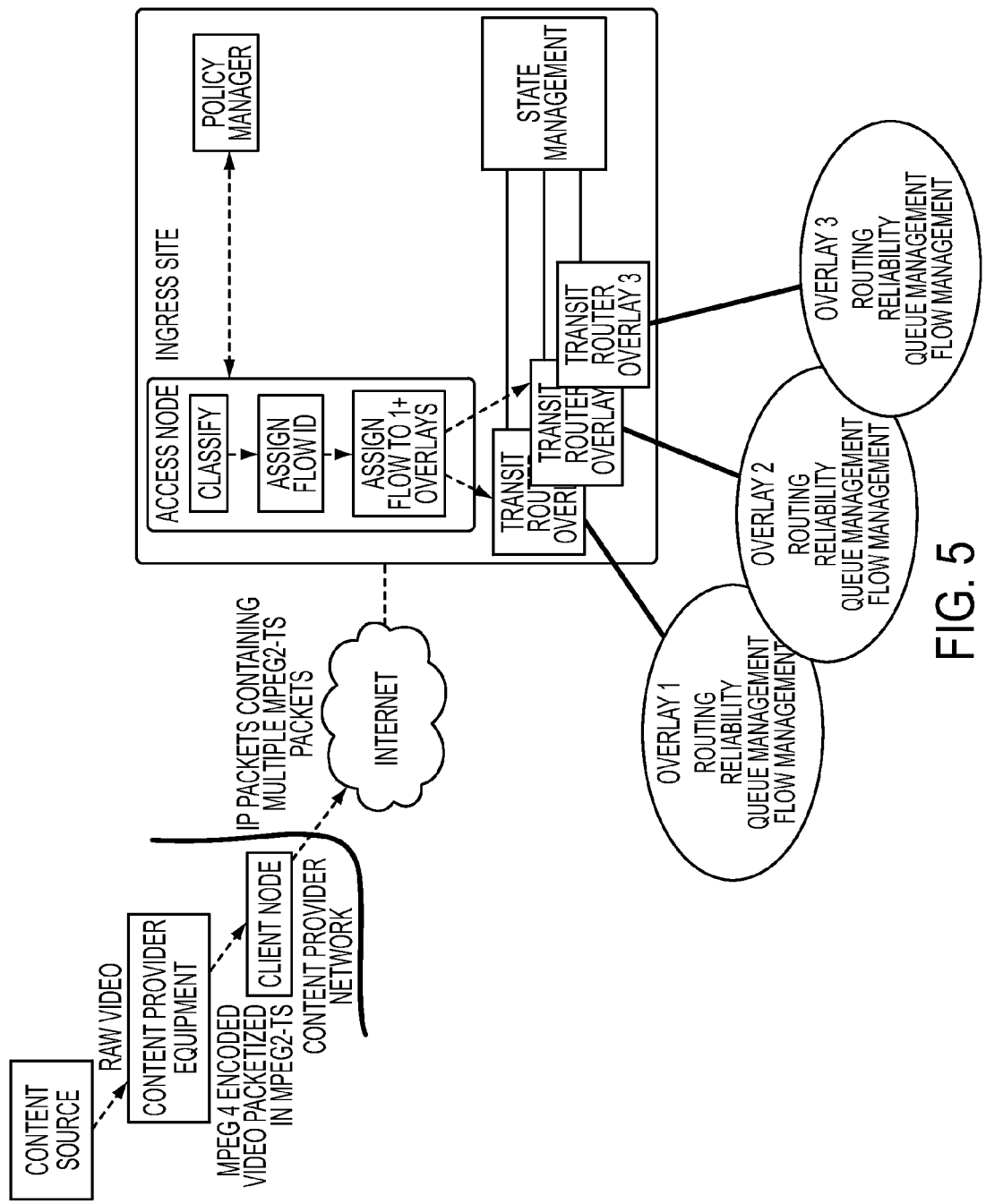
FIG. 5 shows the block diagram of one embodiment of an ingress site.

FIG. 5 shows the block diagram of one embodiment of an ingress site that receives content from a service provider. The site comprises one or more access nodes that receive one or more live flows, e.g., game or video flows, from a content sender node, for example, via the Internet. The sender node can be any type of a client node that is under the control of the service provider. The access nodes classify the live flows according to one or more routing polices defined by a policy management block. Once classified, the access nodes assign IDs to the live flows. Each flow ID is assigned to one of a plurality of parallel overlay networks. Each overlay network has an overlay node in one or more transit routers located in the ingress site. A state management block in the ingress site coordinates the sharing of state information within the one or more transit routers of the ingress site and those in other sites.

Figure 6:
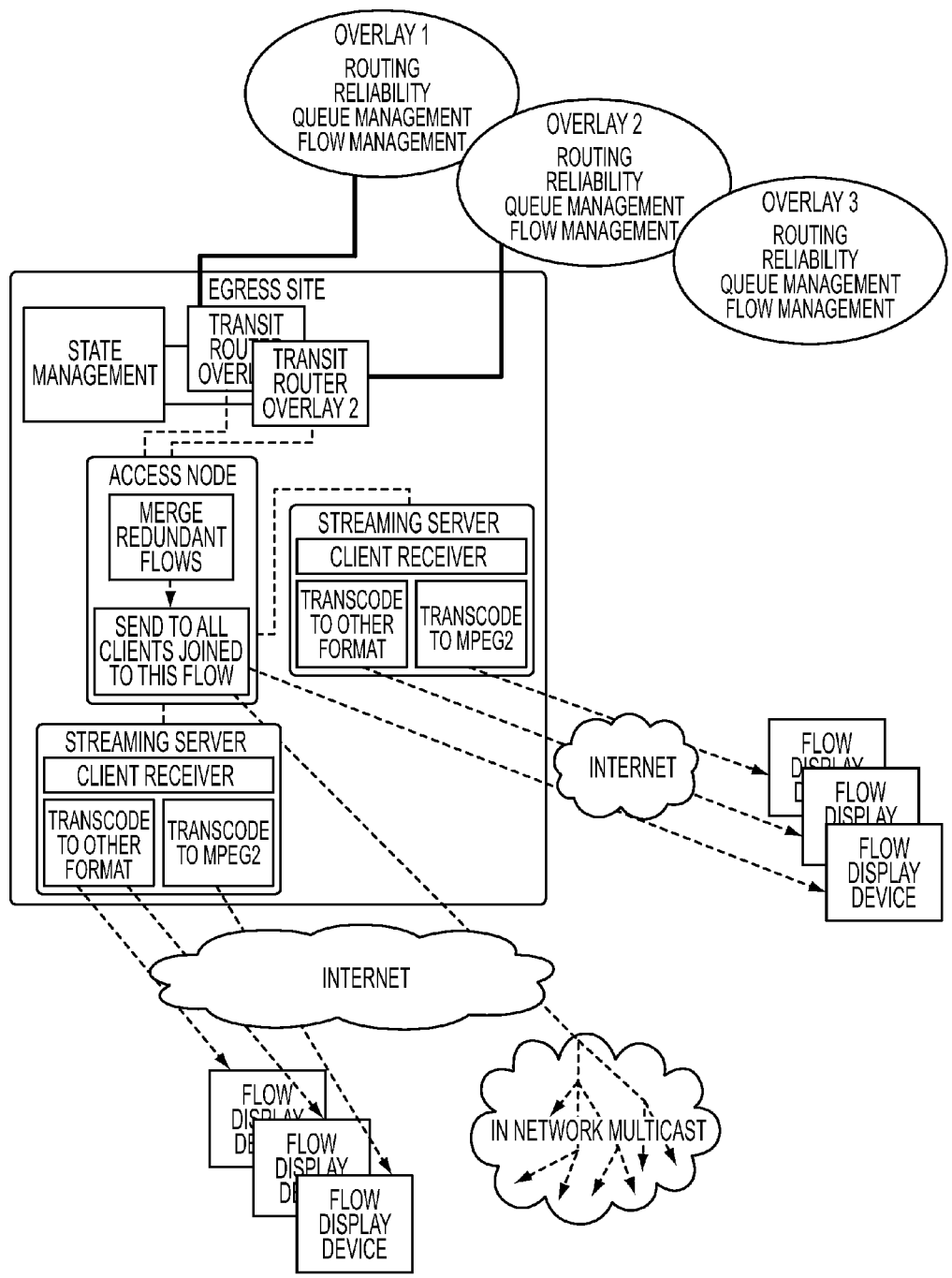
FIG. 6 shows the block diagram of an egress site.

FIG. 6 shows the block diagram of an egress site that delivers content to subscribers at destination client nodes. The live flows received over the plurality of parallel overlay networks at corresponding overlay nodes of one or more transit routers located at the egress site. Another state management block in the ingress site coordinates the sharing of state information within the one or more transit routers of the egress site and those in other sites. One or more access nodes in the egress site merge redundant flows and send them to client nodes that can join in for receiving the flows in real time. One or more streaming servers convert or transcode the content to various formats supported each receiver node.

Figure 7:
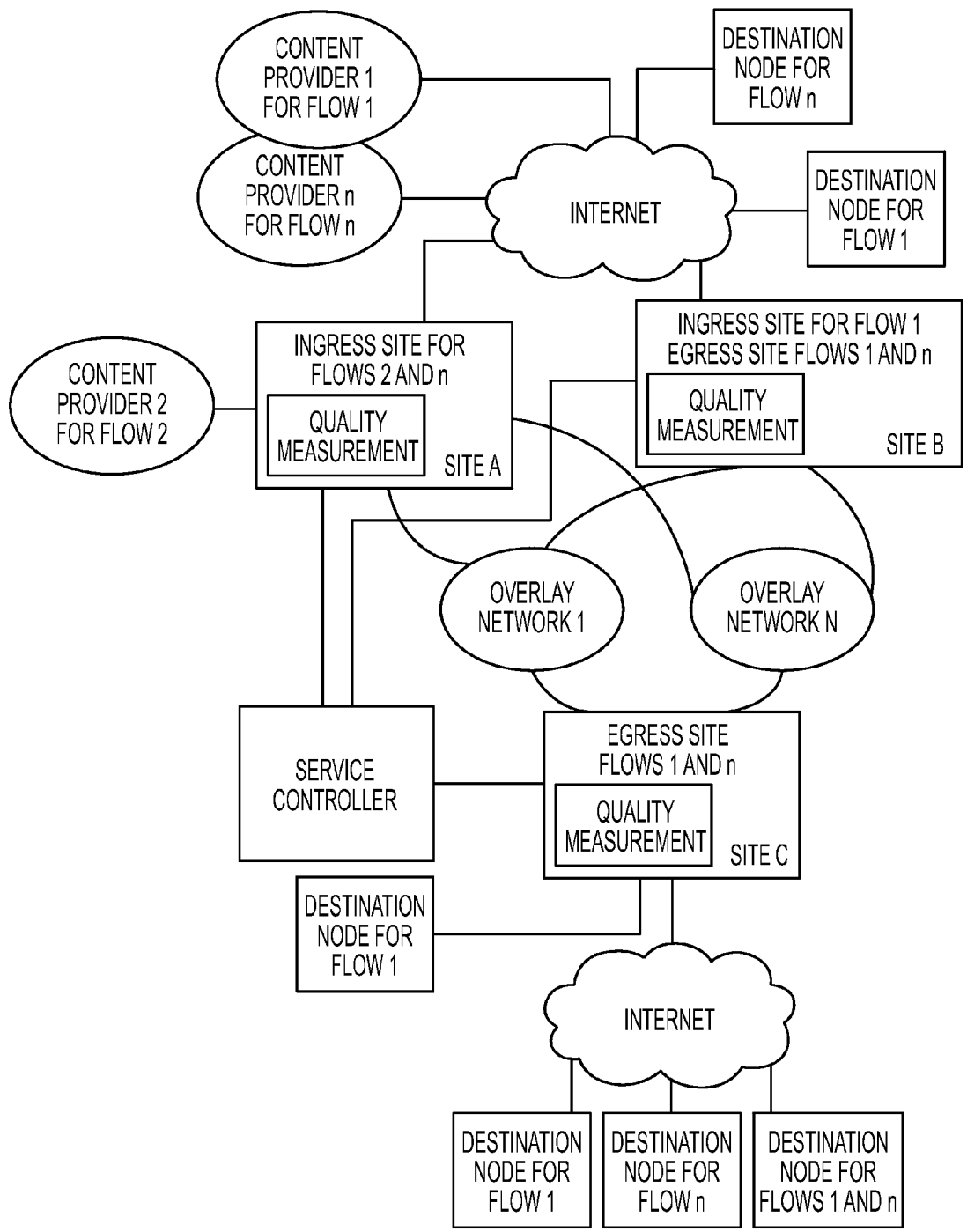
FIG. 7 shows the block diagram of an FTDN for delivery of flows within a network that has one or more receiver nodes

FIG. 7 shows the block diagram of an FTDN for delivery of flows within a network that has one or more receiver nodes. The flows are delivered via a plurality of sites such that each flow has a content provider connected (directly or through the Internet) with an ingress site. Each site has at least one transit router with a plurality of overlay nodes executing parallel overlay processes associated with the plurality of overlay networks. Flows are delivered to specific receiver nodes through egress sites to which these receiver nodes connect (directly or through the Internet). For example, Content Provider 1 with Flow 1 connects through the Internet with Site B, which therefore servers as Flow 1's ingress site. Flow 1 has sites B and C as egress sites: Flow 1 is delivered to one receiver node connected with Site B through the Internet, two receiver nodes connected with Site C through the Internet and one receiver node connected with Site C directly. Similarly, Flow n from Content Provider n has Site A as an ingress site and sites B and C as egress sites: Flow n is delivered to one receiver node connected with Site B and two receiver nodes connected with Site C, all connected through the Internet. Content Provider 2 with Flow 2 connects directly with Site A, which therefore servers as Flow 2's ingress site. However, currently no receiver node is interested in Flow 2 and therefore it has no egress sites and is not flowing on the parallel overlay networks out of site A. The parallel overlay networks use an inter-site network, e.g., the Internet, to deliver each flow from its ingress site to its respective egress sites and from them to one or more receiver nodes. FIG. 7 also shows a service controller that controls the delivery of specific flows to specific receiver nodes based on service requests received from the receiver nodes. The service requests relate to state information that is shared amongst the overlay processes. The service controller can be distributed or centralized, and is either as part of the FTDN, outside the FTDN, or split such that a component of it is part of the FTDN.

In FIG. 7, the FTDN delivers flows through the parallel overlay networks to the one or more receiver nodes over a plurality of physical links in the underlying network that are associated with a plurality of bandwidth costs. Some links may be more expensive to deliver flows on and vice versa.

Quality measurement nodes executing quality measurement processes are associated with the links and the flows. The flows that are routed through the parallel overlay networks are delivered to the one or more receiver nodes over links selected by transit routers based on the bandwidth costs and quality measurements, such as latency, jitter or link reliability. The links can also be selected based on routing weight, available bandwidth or a hop-count. Another approach is to select links to optimize bandwidth cost while ensuring that the routing tree maintains a defined quality measure.

Packet Recovery

Figure 8:
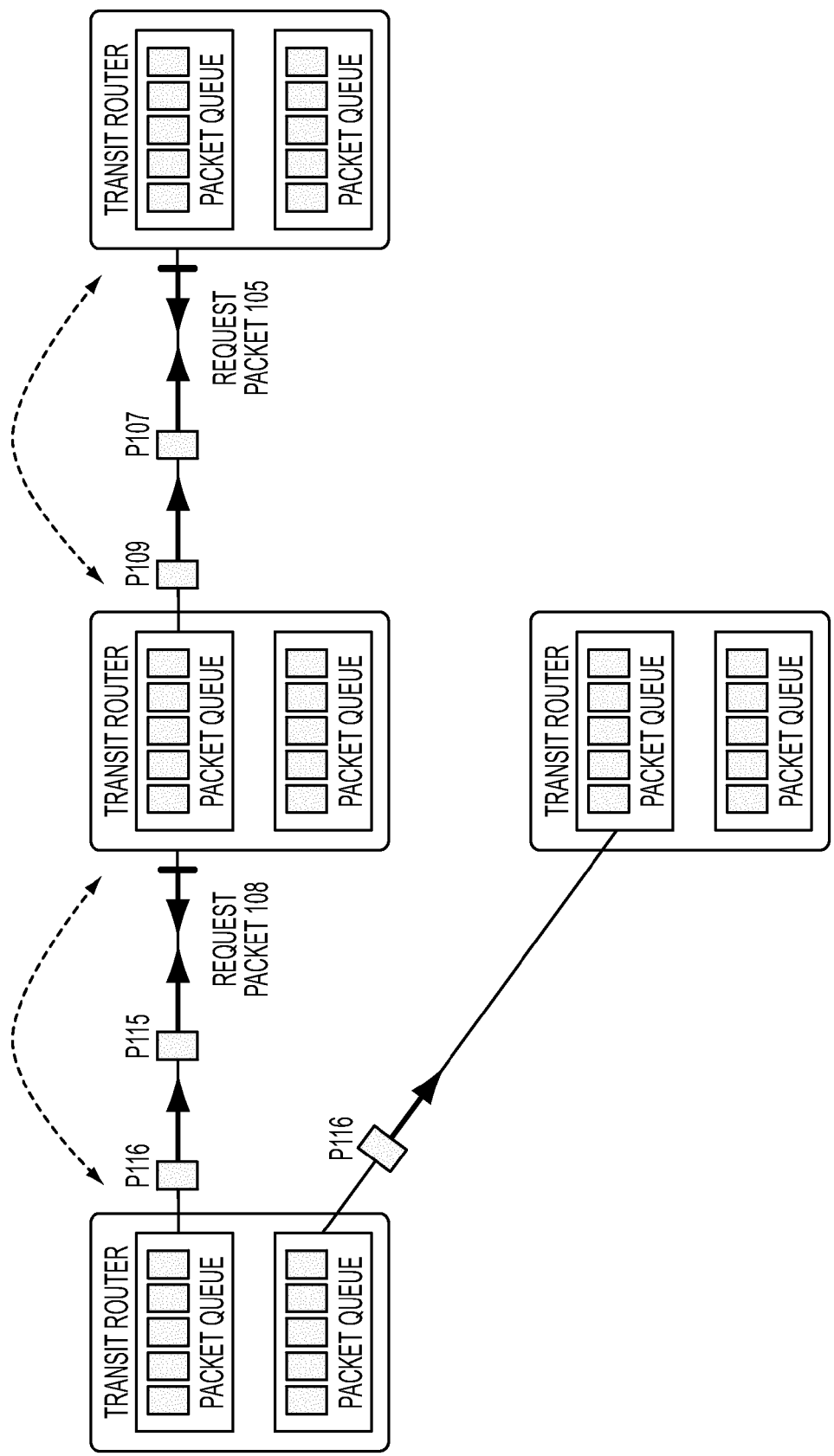
FIG. 8 shows one embodiment of a packet recovery protocol implemented in the FTDN of FIG. 2.

FIG. 8 shows a packet recovery protocol implemented in the FTDN. As each flow passes through multiple transit routers, each may provide local recovery of lost or out-of-order packets between itself and the transit routers one hop upstream from them. As shown, packets 108 and 105 are requested because they were lost between two transit routers. Packet 109 is forwarded on to a third transit router even though a previous packet 108 is still being recovered. This out-of-order forwarding prevents the delay caused by convoy effects and cascading losses. Several different algorithms may be used to provide different service levels. Exemplary algorithms include full reliability (even in the case of complete router failures), reliable transport unless a transit router involved in the flow fails, partial reliability where some packet loss is possible but at a much lower rate then the underlying networks' packet loss, and unreliable packet delivery where no additional efforts are made if packets are lost by the underlying network during transit between transit routers.

In one embodiment, the overlay processes use an overlay protocol that supports recovering a lost packet associated with a flow and reordering the packet after it is recovered. Lost packets can be recovered on a hop-by-hop basis. The overlay processes can also use an overlay protocol that supports recovery of lost packets associated with multiple flows over one hop upstream from another overlay node. Alternatively, the overlay protocol can either not support any packet recovery, support recovery of some lost packets, or support reliable message transport. In order to simplify understanding of the present invention, the packet recovery protocol of the invention is described in terms of a uni-directional protocol between the sender node and receiver node where the receiver does not act as a sender node. However, the protocol can be made bidirectional by running two instances of the protocol, one in each direction across the underlying physical link.

In another embodiment, the overlay processes provide access to the overlay network to nodes that are not running overlay processes and are not part of the overlay network. The nodes not running an overlay process (called IP nodes) use an IP network or the Internet to communicate between themselves and one of the overlay nodes. The IP nodes can act as a sender node or receiver node of data flows to and from the overlay network by using the selected overlay process as a gateway to the overlay network. The IP node and overlay process use a deadline-driven packet recovery protocol as described below to recover packets lost on the IP network between them, while meeting their delivery deadlines.

The present invention can also be applied to flows of packets between IP nodes and Access Overlay Routers which are connected by last mile transmission medium on an IP access network. The IP node and Access Overlay Router establish a virtual link through a point-to-point overlay protocol which uses a deadline-drive packet recovery protocol as described below. The Access Overlay Router then takes the data flows from the IP node and forwards them onto a second IP network that contains the ultimate receiver node for the data. The communication on this second IP network does not need to use the deadline-driven recovery protocol for packets on it (and therefore does not require any modification or upgrade to support this invention). This network could provide good quality end-to-end performance through other techniques such as good engineering and network design producing a very low loss on the physical network or could employ lower-layer recovery or reliability techniques at layer 2 of the network.

According to one aspect of the present invention, packets between sender and receiver overlay nodes of an overlay network are transmitted by executing a packet recovery process at the receiver node and executing a packet retransmission process at the sender overlay node. Based on conditions set forth below, the packet recovery process generates requests for retransmission of transmitted packets and the packet retransmission process retransmits the transmitted packets based on a retransmission request. More specifically, the packet recovery process generates the retransmission requests upon satisfaction of a packet recovery condition that is associated with meeting a deadline driven criteria for transmitted packets and transmits the request to the sender node at scheduled times that are associated with the receiver node. Upon the first receipt of a request for retransmission of the transmitted packet, the packet retransmission process retransmits the transmitted packets at scheduled times that are associated with the sender node. The scheduled times associated with the receiver node are based on a target deadline that is associated with the deadline driven criteria that must be met for satisfying the packet recovery condition. If and when the packet recovery condition is satisfied, the packet recovery process initiates transmitting retransmission requests to the sender nodes at the scheduled times. The packet retransmission process retransmits the transmitted packets from the sender node at scheduled times that are also based on the target deadline.

Because the deadline driven packet recovery protocol of the invention retransmits the transmitted packets without relying on an acknowledgement, it has a semi-reliable channel architecture that pays an additional bandwidth cost (beyond the original transmission) only when a retransmission is required. Thus, at the cost of 1 round-trip time plus time required to suspect a lost packet, the present invention adds no overhead for the vast majority of packets that are not suspected. This is in contrast, for example, with Forward-Error-Correction protocols that add overhead related to all packets, in the form of redundant encoded blocks. This is a substantial benefit, especially in high-bandwidth applications. Further, when a retransmission is required, the present invention may use disjoint path links to decouple or otherwise de-correlate the loss characteristics of the retransmissions.

The present invention also uses time-diversified retransmissions in order to reduce time-correlated losses, thereby achieving a high level of reliability while meeting deadlines. In this way, the present invention applies time and space diversity to a network communication protocol to reduce communication losses associated with correlated errors. As used herein, the term channel refers to a method of sending messages from one node to another node. In one exemplary embodiment, a channel can be a combination of communication protocols and one or more physical communication links. As such, channels in the present invention can have a variety of underlying implementations. For example, two channels may use different protocols to send messages over the same physical network, they may use the same protocol to send messages over different physical networks, or they can combine both techniques. A channel may also include functionality to adapt to changing network conditions.

Various embodiments of the present invention described herein relate to several specific channels that provide timely and highly-reliable packet delivery over unreliable networks. A sender node may dynamically choose the best channel to use for message transmission based on application dependent time deadlines, desired reliability, assumptions regarding message loss, and the cost of each channel. A receiver node also dynamically selects the best channel to use to send its retransmission requests.

Loss in a network such as the Internet can have a number of different characteristics depending on the quality of the network, the route, and other factors. One of the common characteristics is that the losses are often correlated, i.e. if one packet is lost, a following packet is more likely to be lost. The exact amount and duration of loss correlations varies, but it is often the result of routers dropping packets when queues overflow and sharp changes occur in the instantaneous rates of transmission on network links. Losses manifest themselves as the loss of entire packets. This occurs because routers drop entire packets when queues overflow. Also, bit errors cause IP checksums to fail, which results in the networking stack dropping the entire packet.

Each protocol is defined as a set of sender processes and receiver process that communicate over network links and follow a set of rules that define what computation each process does and what transmissions they initiate over the links in response to the receipt of network packets or other events or conditions. Examples of such processes are the packet retransmission process executed in the sender node and the packet recovery process executed in the receiver node according to various embodiments of the present invention. The network links used may be Ethernet segments, point-to-point UDP/IP paths over the Internet, or VPN tunnel links. The physical network links provide a method to identify endpoints and allow for passing variable-length packets from one endpoint to another with a non-negligible chance of success. The delay that a packet may experience when crossing the network link may vary with each packet, and the set of physical resources the packet uses may differ for each packet.

The rules that a protocol follows are typically defined as a state machine which specifies what state a process, e.g., the packet recovery process and packet retransmission process, is in, what events are possible in that state, and what the process should do in response to those events both computationally and by communicating with other processes. For these protocols, the events include internally triggered events, e.g., sending a new packet on the network link. An externally triggered event is one in which the process does not control when or whether it is triggered, e.g., the receipt of a packet from the network. That is, the event could never happen, happen often, or at any arbitrary time. The possible events in an exemplary protocol according to the present invention are:

InitiateMessage, which is an external event taking place when some entity outside the protocol provides a new message that it wants the protocol to send over the link.

SendPacket, which is an internal event that takes place when the protocol process sends a packet onto the underlying network.

ReceivePacket, which is an external event taking place when the underlying network delivers a packet that arrived from the network link to the protocol process.

DeliverMessage, which is an internal event taking place when the receiver protocol process delivers a message to an external process after successfully receiving it from the sender process.

TimeOut, which can be either an internal event or an external event. TimeOut takes place when a protocol process can schedule a TimeOut event to occur at a later time. When the scheduled time arrives (as determined by some external clock) the process receives the TimeOut event and any associated information when it was scheduled. If a process has not scheduled any TimeOut events it will not experience any. A process can de-schedule a TimeOut event that has not yet occurred and then such an event will not be delivered to the process at a later time.

In one embodiment, the sender node receives InitiateMessage events from some upper layer application or protocol, and ReceivePacket events from the underlying network links. The sender node generates SendPacket events to transmit packets on the underlying network and can schedule TimeOuts that cause the process to receive TimeOut events at a later time. The receiver node also receives ReceivePacket events and can generate TimeOut and SendPacket events. The receiver node can also generate a DeliverMessage event to hand a message up to the receiving application or upper layer protocol.

N/M-Strikes Protocol

The N/M-strikes protocol according to the present invention defines a family of channel protocols that provide a very high level of reliability for streams of deadline driven packets by efficient use of the bandwidth. It should be noted that the protocols does not guaranteeing that no loss would be experienced and does not enforce in-order delivery of packets. The protocol is given a target time budget by the application or upper level system. The protocol would attempt to deliver all packets to the receiver within that target time. This time target is defined as D units of time after a message is initiated. The protocol requires the following parameters:

1) A parameter "N" which defines how many times the packet recovery process should send requests for retransmission of transmitted packets that require recovery.
2) A parameter "M" which defines how many times the packet retransmission process should retransmit transmitted packets that require recovery.
3) "N" number of timeout values associated with the packet recovery process that relate to "N" scheduled times for transmission of requests for retransmission of transmitted packets that require recovery.
4) "M" number of timeout values associated with the packet retransmission process that relate to "M" scheduled times for retransmission of transmitted packets that require recovery. The M scheduled times for retransmission of transmitted packets are relative to the receipt of the request for retransmission of the transmitted packet. That is, the M scheduled times are relative to when the first request for retransmission of a transmitted packet is received at the sender node, but not to subsequent requests for retransmission of the same transmitted packet.

The N and M are non-zero positive integers and at least one of N number of scheduled times or M number of scheduled times is greater than one.

Figure 9:
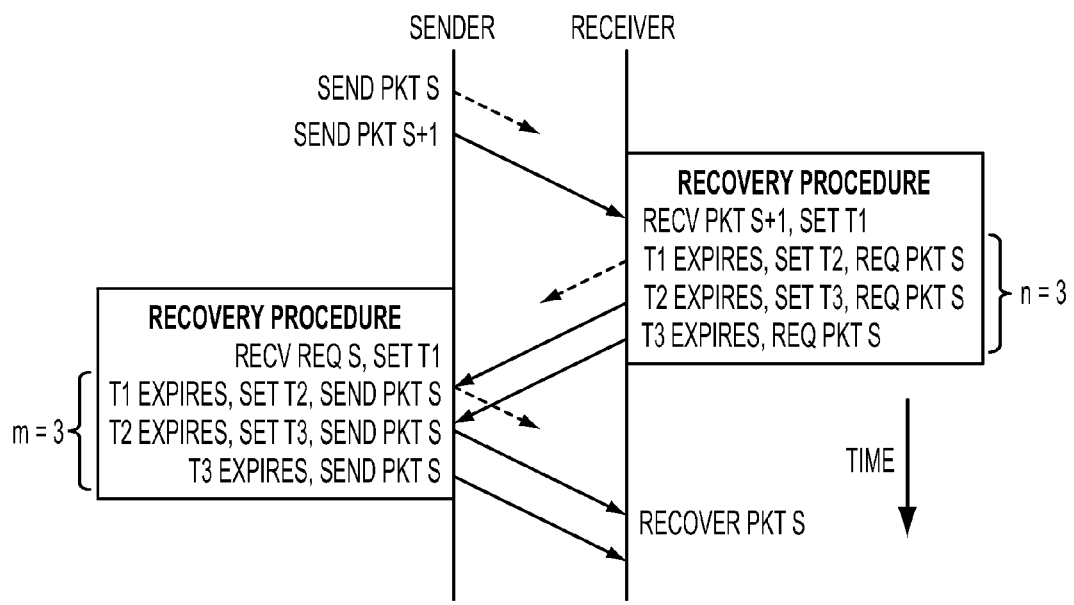
FIG. 9 shows an exemplary embodiment of the N/M-strikes protocol according to the present invention.

FIG. 9 shows an exemplary embodiment of the N/M-strikes protocol according to the present invention. In this example, tailored to an FTDN network that has a latency of about 10 ms between neighboring overlay nodes, N is set to 3 and N number of scheduled times of 3 ms, 8 ms, 13 ms (relative to the satisfaction of the packet recovery condition) are defined. Then, request timers for transmitting retransmission requests to the sender node are set, so that request timer $T1$=the first scheduled time, request timer $T2$=the relative time between the first and second scheduled times, and request timer T3=the relative time between the second and third schedule times.

Also in this example, M is set to 3 and M number of retransmission timers correspond to scheduled times for retransmitting transmitted packets to the receiver node. In one embodiment, the first retransmission timer for the M number of scheduled times, namely, retransmission timer T1 is set to 0. This means that there would be no delay or otherwise immediate retransmission of the transmitted packet after the receipt of the first request for retransmission at the sender node. A non-zero delay for the first retransmission may also be set depending on the underlying link conditions. In this example, the subsequent retransmission timer T2 is set to 5 ms relative to when the first request for retransmission of the transmitted packet is received at the sender node, and retransmission timer T3 is also set to 5 ms relative to retransmission timer T2, which corresponds to 10 ms from the receipt of the first request for retransmission at the sender node. It should be noted that the retransmissions are scheduled regardless of whether the receiver node acknowledges receipt of the requested packet to the sender node.

When the sender node receives an InitiateMessage event, it assigns sequence numbers to the transmitted packets. The sequence number variable is incremented for each of the successive transmitted packets. A copy of each transmitted packet is saved in a memory location in the sender node before the transmitted packet is sent to the receiver node. The sender node also stores a local variable corresponding to the current maximum sequence number it has assigned to the transmitted packets, and a list of the transmitted packets (with their contents) that have been sent.

The receiver node keeps track of the sequence number of the transmitted packets it receives from the sender node. More specifically, the receiver node keeps track of the minimum and the maximum value of the sequence numbers of the transmitted packets it receives from the sender node within a defined period of time. The minimum value of the received sequence numbers is stored in variable MinRecvSeq, the maximum value of the received sequence numbers is stored in variable MaxRecvSeq and the defined time period is stored in variable GarbageCollectDelay. When the protocol is initialized, it sets MinRecvSeq and MaxRecvSeq to 0 and sets GarbageCollectDelay to a time greater then D, possibly on the order of 2 or 3 times D. This way, the maximum sequence number seen at a time 'far' in the past in terms of GarbageCollectDelay units of time in the past is set as a cutoff value for whether 'late' arriving data packets should be discarded. Thus, the GarbageCollectDelay variable corresponds to how often the receiver node updates the MinRecvSeq and MaxRecvSeq variables. The MinRecvSeq keeps track of the sequence number such that any packet with a lower sequence number is discarded. The MaxRecvSeq keeps track of the highest sequence number seen during the previous GarbageCollectDelay interval. Also at that time, it registers a TimeOut event that calls the UpdateMinRecvSeq procedure to trigger every GarbageCollectDelay units of time. The UpdateMinRecvSeq procedure sets MinRecvSeq equal to MaxRecvSeq, and sets MaxRecvSeq equal to the highest sequence number the receiver has seen a packet with.

When the receiver receives a ReceivePacket event, if the packet has a sequence number less then MinRecvSeq, it is discarded. Otherwise, if the packet was not delivered before, the receiver generates a DeliverMessage event with the packet contents, marks the packet as delivered, and examines the sequence number of the received packet to determine if the sequence number indicates the potential loss of an earlier packet. Immediately upon suspecting a lost packet, the receiver node activates a packet recovery process for that packet. In one exemplary embodiment of the invention, the rule for suspecting the occurrence of a lost packet is if the receiver node gets a packet with a higher sequence than the previous highest sequence number plus 1. In that case, the protocol suspects loss of all packets with sequence numbers greater than the previous highest sequence and less then the sequence number of the received packet. Note, packets arriving out-of-order (but that will eventually arrive) are initially suspected as lost under this rule.

Figures 10, 11:
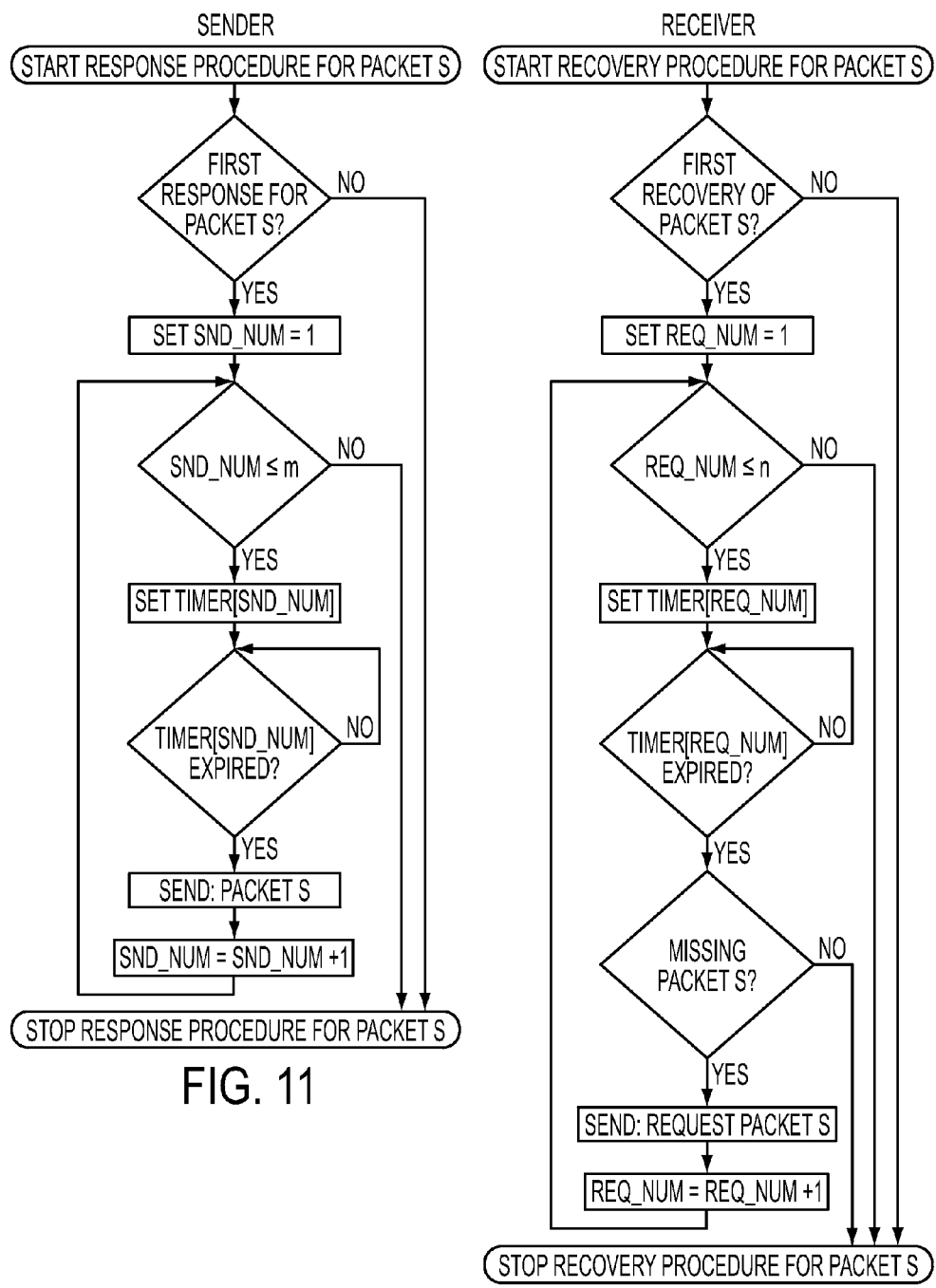
FIG. 10 shows the flow chart of an example of the packet recovery process according to one aspect of the invention.
FIG. 11 shows the flow chart for one example of the packet retransmission process according to one aspect of the invention.

FIG. 10 shows the flow chart of an example of the packet recovery process, where the variable req_num refers to which of the N iterations of sending requests for retransmission of transmitted packets. As shown, the packet recovery process schedules a TimeOut event, timer_r1, to occur a short time in the future (e.g. 3 ms) for that specific suspected lost packet. Upon expiration of timer_r1, the packet recovery process checks whether the packet is still missing. If the packet is no longer missing, the packet recovery process terminates. Otherwise, the packet recovery process generates a request for retransmission, request_1, sends the request to the sender node by generating a SendPacket event, and schedules a new TimeOut event, timer_r2, for the suspected packet to trigger at a short time in the future (e.g. 5 ms).

The packet recovery process continues checking whether the packet is still missing upon expiration of timer_ri, and if so it generates a request, request_i that is sent to the sender. A new TimeOut event timer_r{i+1} is set and the process continues for (no more than) n times. Then, the packet recovery process terminates even it the lost packet is not recovered.

According to one aspect of the invention, the packet recovery process is executed at the receiver upon satisfaction of a packet recovery condition that is associated with meeting a deadline driven criteria. Such criteria may be associated with a transmitted packet from an adjacent sender overlay node to a receiver overlay node.

Alternatively, the deadline driven criteria may be associated with communication between an IP node of an IP network and an overlay node of an overlay network that runs over the IP network. This embodiment covers transmitting packets between the IP node and the overlay node where one of the IP node and overlay node comprises a receiver node and the other comprises a sender node, The deadline driven criteria may also be associated with transmitting packets between a node and an Access Overlay Router that communicate over a last mile transmission medium of an IP access network, as defined above. The Access Overlay Router is a node that executes a process that bridges data flows to or from overlay protocol links with data flows on an IP network. The Access Overlay Router may have multiple network interfaces and may communicate on multiple IP networks as well as one or more overlay protocol links. The packet recovery transmission can take place over both the last mile network and a second IP network, with one of the IP node or the Access Overlay Router being a receiver node and the other being a sender node that is coupled to the receiver node, defining a protocol running between a client device and an access/aggregation gateway on a last-mile access network and then interfacing with either an overlay network or a private IP network.

The packet recovery process associates N number of scheduled times with N requests for retransmission of the transmitted packet. At least one of the N scheduled times includes a receiver waiting time. A receiver waiting time comprises a non-zero delay. The N scheduled times relate to the satisfaction of the packet recovery condition such that at least one of the N scheduled times includes a receiver waiting time. At each scheduled time, a request for retransmission of the transmitted packet is transmitted to the sender node. Immediately upon the sender receiving a ReceivePacket event containing a request, the sender checks the sequence number of the requested packet to determine whether the sender node has previously received a request for retransmission of the transmitted packet. If it has previously seen such request, the sender node ignores this new request. If the request is the first request for a retransmitted packet from the receiver node, the sender node activates a packet retransmission process for that packet.

FIG. 11 shows the flow chart for one example of the packet retransmission process, where snd_num refers to which of the M iterations of sending retransmissions the protocol is executing. The packet retransmission process schedules M successive TimeOut events: timer_s1, . . . , timer_sm, each recording the sequence number it represents. When a TimeOut event is received for one of these timer_si events, the sender node generates a new SendPacket event to retransmitted the transmitted packet corresponding to the recorded sequence number. Typically, timer_s1 is set to a delay of 0, so as to cause an immediate TimeOut event that causes a re-send of the packet. The specific timeouts for the later timer-si events depend on the network loss characteristics of the underlying physical network.

Accordingly, the packet retransmission process executed at the sender node upon the first receipt of a request for retransmission of the transmitted packet. The packet retransmission process comprises associating M number of scheduled times with M retransmissions of the transmitted packet to the receiver node. The M scheduled times are relative to the first receipt of the request for retransmission of the transmitted packet, with at least one of the M scheduled times including a sender waiting time. A sender waiting time comprises a non-zero delay. At each scheduled time, the packet retransmission process retransmits the transmitted packet to the receiver node. The N and M are non-zero positive integers with at least one of N number of scheduled times or M number of scheduled times being greater than one.

A non-zero delay for the first retransmission request timer_r1 allows for out of order receipt of packets from the network without causing the generation of spurious retransmission requests. The later timer_r2, timer_r3, . . . , timer_rn events decrease the probability that retransmission requests are sent during the same window of correlated network loss (bursty loss) without causing a large or unbounded increase in latency. The use of timer_s1, timer_s2, . . . , timer_sm decrease the probability that the retransmitted packets will be sent during the same window of correlated network loss (burst).

Erasure Coded Retransmission Protocol

Another aspect of the protocol of the invention uses the basic structure of the N/M-strikes protocol described above and further defines a new packet retransmission process and a method of handling erasure coded retransmissions in the receiver node. The protocol according to this embodiment differs from conventional and known erasure coding protocols such as Forward Error Correction protocols, because it only applies the erasure coding to the packets that must be retransmitted, not to all of the transmitted packets. Only applying codes to retransmitted packets reduces bandwidth overhead when no actual losses occur. The bandwidth overhead is only incurred for those packets that were suspected lost. Under this protocol, there is a delay before a lost packet can be recovered of at least one round-trip time plus some processing time.

Figure 12:
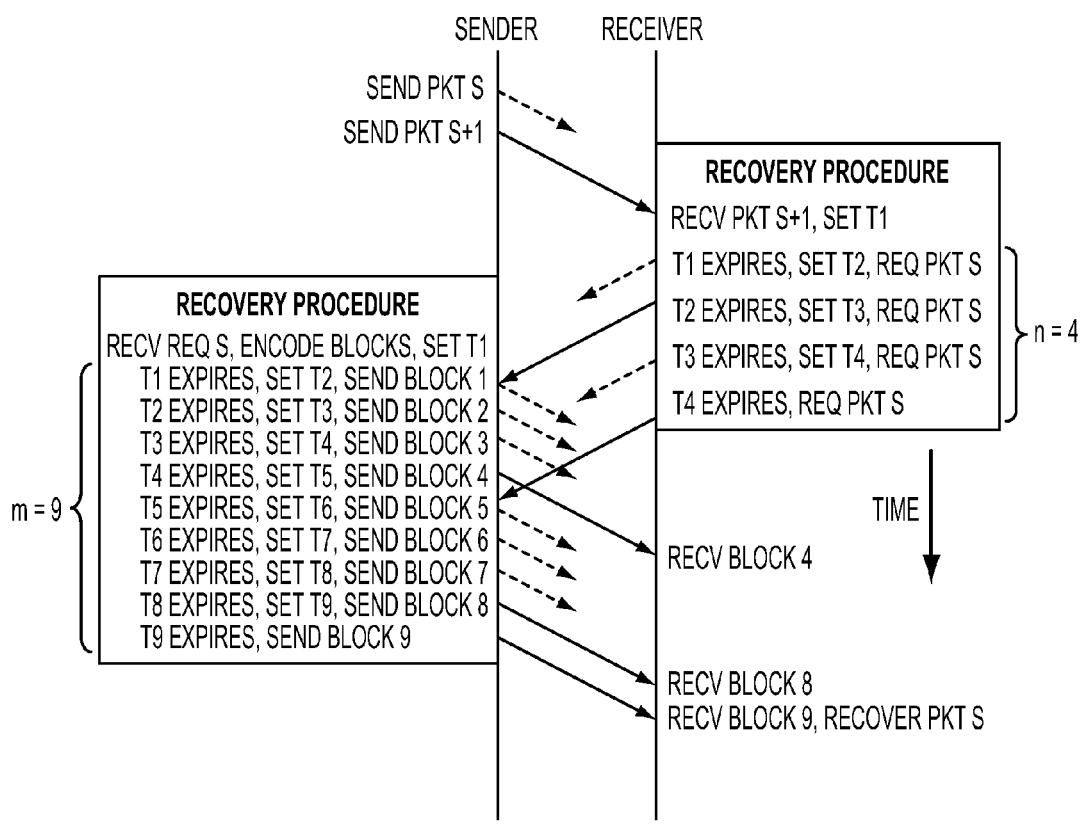
FIG. 12 shows the flow diagram of an erasure code retransmission protocol according to another aspect of the invention.

FIG. 12 shows the flow diagram of the erasure code retransmission protocol according to another aspect of the invention. The packet retransmission process divides the requested packet into two pieces: a recovery header and a recovered body. The recovery header contains the original sequence number assigned to the packet, an identification of the sender node, and a type field indicating this is a retransmitted and coded packet. The recovered body contains the rest of the original packet header and the entire original packet body. The recovered body is then split into k blocks, where each block is t bytes long, that is k*t=original packet size minus the size of a sequence number. Then, the k blocks are passed into an erasure coding function (Er), along with a redundancy factor (r).

One examples of erasure coding function (Er) that can be used is described in "An XOR-based erasure-resilient coding scheme", J. Blomer, M. Kalfane, M. Karpinski, R. Karp, M. Luby, and D. Zuckerman. Technical Report TR-95-048, International Computer Science Institute, August 1995, which is hereby incorporated by reference. Another example is described in "Effective erasure codes for reliable computer communication protocols", Rizzo, L. 1997. SIGCOMM Computer Communication Review (27, 2) pp. 24-36, April 1997, which is hereby incorporated by reference. The output from Er(k, r) is a set of m=r*k blocks of the same size (t) which are encoded so that if a receiver node gets any k of the rk blocks, it can pass them into the decode function Dr and recreate the original packet. The packet retransmission process sets M new TimeOut events: timer_s1, . . . , time_sm. Upon expiration of timer_si, the sender node initiates SendPacket events in which it sends a new packet to the receiver. The packet contains a recovery header including the sequence number and a block_i containing one encoded block of length t representing the ith erasure coded block. Typically, timer_s1 will be 0.

Upon receiving a ReceivePacket event containing an erasure coded retransmission message, block_i, for a packet with sequence number S, the receiver node checks to see if it has already recreated or received packet S. If not, it stores block_i indexed by S. Upon receiving M distinct erasure coded blocks for packet S, the receiver recreates the packet and delivers it.

To meet a particular time deadline, D, the timers should ideally be set so that the sum of the following three factors is no more than D: (1) 3 times the maximum latency between the sender and receiver, (2) The time from when packet with sequence number S is suspected of having been missed to the time that the Nth (final) request is sent, and (3) The time from when the request for packet with sequence number S is received to the time that the final erasure coded part is sent. If this timing constraint is met, the recovery procedure succeeds if any of the requests arrive at the sender node and any set of k or more distinct requests arrive at the receiver node. The sending of the N requests and M coded blocks could be spaced as far apart as possible while still meeting the deadline to minimize the effects of correlated losses. However, the timers can be set so the sum of these factors is greater then D. In that case, a trade off is made between a better chance of avoiding loss correlation and an increased chance that later responses to later requests will not meet the deadline.

Several optimizations are possible when actually sending the data such as piggybacking retransmission blocks onto other packets, or packing several retransmission blocks together into one network packet in order to minimize the overhead of packet headers. Piggybacking the retransmission blocks can be effective since these blocks are much smaller then a normal packet size (t<k*t) and thus they can be combined with a less than full sized new message that needs to be sent to fully use the available bytes in a maximally sized network packet with a single header. If multiple packets are currently being retransmitted, then the encoded blocks from several different original packets can be packed into one network packet without compromising on recovery probabilities, thus transmitting maximally sized network packets resulting in a minimum of header overhead and per-packet CPU costs. When using either of these techniques, it is preferable to (1) send recovery messages in time to meet the deadline and (2) send recovery messages at intervals spaced sufficiently far apart to limit as much as possible the effects of correlated losses, and (3) not pack multiple retransmission blocks corresponding to the same original packet into a new packet. This is because the loss of one network packet may cause the loss of many coded retransmission blocks, which would reduce the likelihood of recovering the packet.

Packing multiple retransmission blocks into one packet will cause some compromise in the exact timing of retransmissions as it is rare that two retransmission block timers expire at exactly the same time (or close enough to both occur during the same execution of the TimeOut handler). One approximate solution would be to pack together any retransmission blocks that are due to be sent during the next P units of time where P is much less then the interval between timer_si TimeOut events.

Retransmit on Secondary Physical Link

In another embodiment of the invention, the protocol sends messages over two different networks to introduce space diversity for de-correlating losses. Correlated message losses pose a serious problem for recovery using retransmissions. If a message is lost when it is sent over a physical link for the first time, a retransmission sent over that same link within a short time period is also likely to be lost. In cases where loss correlation is high (i.e., losses are bursty), sending messages redundantly over the same physical link may have limited efficacy. For example, in an extreme case where a network link periodically has one-second spans during which it loses all messages, a 100 ms deadline cannot be met if the original message is lost in the first 900 ms of the link outage, regardless of how retransmission are encoded.

This aspect of the present invention provides a natural solution for such cases. Under this aspect of the invention, a recovery method is defined that uses an arbitrary recovery protocol (based on retransmission of original or encoded packets) and two different network links where the message losses on these networks are not correlated. According to this protocol, one network link (link 1) is used to send the original packet and another link (link 2) is used to send the retransmission (and the retransmission request). This de-correlates the retransmission from the original link loss.

In one embodiment, link 1 and link 2 could have exactly the same cost and reliability. Under this arrangement, one half of the messages are sent over link 1 initially and retransmissions and retransmission requests for these messages are sent using link 2. Link 2 is used to send the other half of the messages and link 1 is used to send the retransmissions and retransmission requests of that other half. Such a configuration has costs that are equivalent to using the two networks independently (i.e., sending the retransmission for a message on the same link over which the message was originally sent), and yet provides much better reliability. In this case, the reliability is improved using transmission methods that, on the surface, appear to have similar reliability and cost. This aspect of the invention circumvents problems related to correlated loss on a single physical network by using two different physical networks that do not suffer from the same correlated losses.

Thus, according to some of the more detailed features of the present invention, the packet recovery process is terminated upon receipt of the transmitted packet from the sender node. The packet recovery condition can be satisfied based on detection of an out-of-order arrival of sequenced packets. The packet recovery condition can also be satisfied after the elapse of a wait period from the detection of the out-of-order arrival of sequenced packets. The wait period can depends on a target deadline associated with the deadline driven criteria. The M scheduled times can each have a corresponding sender waiting time that is dependent on an underlying physical channel characteristics, such as a measured transmission loss and/or a measured latency. A request for retransmission of a transmitted packet, a retransmission of a transmitted packet or an encoded block associated with a transmitted packet can be transmitted over a physical link that is different from the physical link used for transmission of the transmitted packet. Alternatively, requests for retransmission of a transmitted packet, retransmissions of a transmitted packet, or encoded blocks associated with a transmitted packet, can be transmitted on different physical links. Further, one or more of M erasure encoded blocks associated with the same transmitted packet can be transmitted from the sender node to the receiver node more than once. Also, one or more of M erasure encoded blocks associated with different transmitted packets can be included in one network packet that is transmitted from the sender node to the receiver node.

Based on the foregoing it would be appreciated that the packet recovery protocol of the invention provides high reliability channels with bounded delivery latency designed to meet tight application time deadlines. The protocols of the present invention provides the following features:

1) Efficient usage of bandwidth in low-loss environments. Extra bandwidth, beyond that needed for the initial transmission of actual data is only used to recover packets which the protocol has strong evidence are lost.
2) Lost packets have a high probability (but no guarantee) of being recovered even when experienced network loss on a link is highly correlated within a window of time.
3) Allow underlying networks to reorder packets within a small window of time without triggering spurious lost packet detection or causing inefficient loss recovery.
4) Meeting strict real-time deadlines for delivery of packets onto the next link (or final application)

The invention claimed is:

1. A method for transmitting packets between sender and receiver overlay nodes of an overlay network that runs over an underlying IP network, comprising:

a) executing a packet recovery process at a receiver overlay node upon satisfaction of a packet recovery condition that is associated with meeting a deadline driven criteria for a transmitted packet from an adjacent sender overlay node to the receiver overlay node, said packet recovery process comprising:

a1) associating N number of scheduled times with N requests for retransmission of the transmitted packet to the adjacent sender overlay node, said N scheduled times being relative to the satisfaction of the packet recovery condition, wherein at least one of the N scheduled times includes a receiver waiting time; and a2) at each scheduled time, transmitting a request for retransmission of the transmitted packet; and b) executing a packet retransmission process at the adjacent sender overlay node only upon the first receipt of a request for retransmission of the transmitted packet; said packet retransmission process comprising:

b1) associating M number of scheduled times with M retransmissions of the transmitted packet to the receiver overlay node, said M scheduled times being relative to the receipt of the request for retransmission of the transmitted packet, wherein at least one of the M scheduled times includes a sender waiting time; and b2) at each scheduled time, retransmitting the transmitted packet; wherein the N and M are non-zero positive integers and wherein at least one of N number of scheduled times or M number of scheduled times is greater than one.

2. The method of claim 1, wherein the packet recovery process is terminated upon receipt of the transmitted packet from the adjacent sender overlay node.

3. The method of claim 1, wherein the packet recovery condition is satisfied based on detection of an out-of-order arrival of sequenced packets.

4. The method of claim 1, wherein the packet recovery condition is satisfied after the elapse of a wait period from detection of an out-of-order arrival of sequenced packets.

5. The method of claim 4, wherein the wait period depends on a target deadline associated with the deadline driven criteria.

6. The method of claim 1, wherein a plurality of the M scheduled times have corresponding sender waiting times that are dependent on an underlying physical channel characteristics.

7. The method of claim 6, wherein the underlying physical channel characteristics relates to at least one of a measured transmission loss or a measured latency.

8. The method of claim 1, wherein at least one of a request for retransmission of the transmitted packet or a retransmission of the transmitted packet is transmitted over a physical link that is different from the physical link used for transmission of the transmitted packet.

9. The method of claim 1, wherein at least one of a request for retransmission of the transmitted packet and a retransmission of the transmitted packet are transmitted on different physical links.

10. The method of claim 1, wherein a plurality of requests for retransmissions of the transmitted packet are transmitted on different physical links.

11. The method of claim 1, wherein a plurality of retransmissions of the transmitted packet are transmitted on different physical links.

12. The method of claim 1, wherein the overlay network is a message oriented overlay network (MOON).

13. A method for transmitting packets between an IP node of an
IP network and an overlay node of an overlay network that runs over the IP network, wherein one of the IP node and overlay node comprises a receiver node and the other comprises a sender node, comprising:
a) executing a packet recovery process at the receiver node upon satisfaction of a packet recovery condition that is associated with meeting a deadline driven criteria for a transmitted packet from the sender node to the receiver node, said packet recovery process comprising:
a1) associating N number of scheduled times with N requests for retransmission of the transmitted packet to the sender node, said N scheduled times being relative to the satisfaction of the packet recovery condition, wherein at least one of the N scheduled times includes a receiver waiting time; and a2) at each scheduled time, transmitting a request for retransmission of the transmitted packet; and b) executing a packet retransmission process at the sender node only upon the first receipt of a request for retransmission of the transmitted packet; said packet retransmission process comprising:
b1) associating M number of scheduled times with M retransmissions of the transmitted packet to the receiver node, said M scheduled times being relative to the receipt of the request for retransmission of the transmitted packet, wherein at least one of the M scheduled times includes a sender waiting time; and b2) at each scheduled time, retransmitting the transmitted packet; wherein the N and M are non-zero positive integers and wherein at least one of N number of scheduled times or M number of scheduled times is greater than one.

14. The method of claim 13, wherein the packet recovery process is terminated upon receipt of the transmitted packet from the sender node.

15. The method of claim 13, wherein the packet recovery condition is satisfied based on detection of an out-of-order arrival of sequenced packets.

16. The method of claim 13, wherein the packet recovery condition is satisfied after the elapse of a wait period from the detection of an out-of-order arrival of sequenced packets.

17. The method of claim 16, wherein the wait period depends on a target deadline associated with the deadline driven criteria.

18. The method of claim 13, wherein a plurality of the M scheduled times have corresponding sender waiting times that are dependent on an underlying physical channel characteristics.

19. The method of claim 18, wherein the underlying physical channel characteristics relates to at least one of a measured transmission loss or a measured latency.

20. The method of claim 13, wherein at least one of a request for retransmission of the transmitted packet or a retransmission of the transmitted packet is transmitted over a physical link that is different from the physical link used for transmission of the transmitted packet.

21. The method of claim 13, wherein at least one of a request for retransmission of the transmitted packet and a retransmission of the transmitted packet are transmitted on different physical links.

22. The method of claim 13, wherein a plurality of requests for retransmissions of the transmitted packet are transmitted on different physical links.

23. The method of claim 13, wherein a plurality of retransmissions of the transmitted packet are transmitted on different physical links.

24. The method of claim 13, wherein the overlay network is a message oriented overlay network (MOON).

25. The method of claim 13, wherein the IP node and the overlay node communicate over the Internet.

26. A method for transmitting packets over a last mile transmission medium of an IP access network between a node and an Access Overlay Router that communicates over both the last mile network and a second IP network, at least one of the IP node and the Access Overlay Router being a receiver node and the other being a sender node that is coupled to the receiver node, comprising:
a) executing a packet recovery process at the receiver node upon satisfaction of a packet recovery condition that is associated with meeting a deadline driven criteria for a transmitted packet from the sender node to the receiver node, said packet recovery process comprising:
- a1) associating N number of scheduled times with N requests for retransmission of the transmitted packet to the sender node, said N scheduled times being relative to the satisfaction of the packet recovery condition, wherein at least one of the N scheduled times includes a receiver waiting time; and
- a2) at each scheduled time, transmitting a request for retransmission of the transmitted packet; and
- b) executing a packet retransmission process at the sender node only upon the first receipt of a request for retransmission of the transmitted packet; said packet retransmission process comprising:
  - b1) associating M number of scheduled times with M retransmissions of the transmitted packet to the receiver node, said M scheduled times being relative to the receipt of the request for retransmission of the transmitted packet, wherein at least one of the M scheduled times includes a sender waiting time; and
  - b2) at each scheduled time, retransmitting the transmitted packet;
- wherein the N and M are non-zero positive integers and wherein at least one of N number of scheduled times or M number of scheduled times is greater than one.

27. The method of claim 26, wherein the packet recovery process is terminated upon receipt of the transmitted packet from the sender node.

28. The method of claim 26, wherein the packet recovery condition is satisfied based on detection of an out-of-order arrival of sequenced packets.

29. The method of claim 26, wherein the packet recovery condition is satisfied after the elapse of a wait period from a detection of an out-of-order arrival of sequenced packets.

30. The method of claim 29, wherein the wait period depends on a target deadline associated with the deadline driven criteria.

31. The method of claim 26, wherein a plurality of the M scheduled times have corresponding sender waiting times that are dependent on an underlying physical channel characteristics.

32. The method of claim 31, wherein the underlying physical channel characteristics relates to at least one of a measured transmission loss or a measured latency.

33. The method of claim 26, wherein at least one of a request for retransmission of the transmitted packet or a retransmission of the transmitted packet is transmitted over a physical link that is different from the physical link used for transmission of the transmitted packet.

34. The method of claim 26, wherein at least one of a request for retransmission of the transmitted packet and a retransmission of the transmitted packet are transmitted on different physical links.

35. The method of claim 26, wherein a plurality of requests for retransmissions of the transmitted packet are transmitted on different physical links.

36. The method of claim 26, wherein a plurality of retransmissions of the transmitted packet are transmitted on different physical links.

37. A method for transmitting packets between sender and receiver overlay nodes of an overlay network that runs over an underlying IP network, comprising:
- a) executing a packet recovery process at a receiver overlay node upon satisfaction of a packet recovery condition that is associated with meeting a deadline driven criteria for a transmitted packet from an adjacent sender overlay node to the receiver overlay node, said packet recovery process comprising:
  - a1) associating N number of scheduled times with N requests for retransmission of the transmitted packet to the adjacent sender overlay node, said N scheduled times being relative to the satisfaction of the packet recovery condition, wherein at least one of the N scheduled times includes a receiver waiting time; and
  - a2) at each scheduled time, transmitting a request for retransmission of the transmitted packet; and
- b) executing a packet retransmission process at the adjacent sender overlay only node upon the first receipt of a request for retransmission of the transmitted packet; said packet retransmission process comprising:
  - b1) using an erasure coding function, with integer parameter k greater than 1 and less than M, to generate M encoded blocks such that any k out of M encoded blocks are sufficient to recreate the transmitted packet at the receiver node;
  - b2) associating M number of scheduled times with each one of the M encoded blocks to the receiver overlay node once, wherein at least one of the M scheduled times includes a sender waiting time; and
  - b3) at each scheduled time, transmitting a corresponding one of the M encoded blocks to the receiver node;
- wherein the N and M are non-zero positive integers and M is greater than two.

38. The method of claim 37, wherein the packet recovery process is terminated upon receipt of the transmitted packet from the sender node.

39. The method of claim 37, wherein the packet recovery condition is satisfied based on detection of an out-of-order arrival of sequenced packets.

40. The method of claim 37, wherein the packet recovery condition is satisfied after the elapse of a wait period from a detection of an out-of-order arrival of sequenced packets.

41. The method of claim 40, wherein the wait period depends on a target deadline associated with the deadline driven criteria.

42. The method of claim 37, wherein a plurality of the M scheduled times have corresponding sender waiting times that are dependent on an underlying physical channel characteristics.

43. The method of claim 42, wherein the underlying physical channel characteristics relates to at least one of a measured transmission loss or a measured latency.

44. The method of claim 37, wherein at least one of a request for retransmission of the transmitted packet or a encoded block is transmitted over a physical link that is different from the physical link used for transmission of the transmitted packet.

45. The method of claim 37, wherein at least one of a request for retransmission of the transmitted packet and an encoded block are transmitted on different physical links.

46. The method of claim 37, wherein a plurality of requests for retransmissions of the transmitted packet are transmitted on different physical links.

47. The method of claim 37, wherein a plurality of encoded blocks are transmitted on different physical links.

48. The method of claim 37, wherein one or more of the M erasure encoded blocks associated with the same transmitted packet are transmitted from the sender node to the receiver node more than once.

49. The method of claim 37, wherein one or more of the M erasure encoded blocks associated with different transmitted packets are included in one network packet that is transmitted from the sender node to the receiver node.

50. The method of claim 37, wherein the overlay network is a message oriented overlay network (MOON).

51. A method for transmitting packets between an IP node of an
IP network and an overlay node of an overlay network that runs over the IP network, wherein one of the IP node and overlay node comprises a receiver node and the other comprises a sender node, comprising:
   a) executing a packet recovery process at the receiver node upon satisfaction of a packet recovery condition that is associated with meeting a deadline driven criteria for a transmitted packet from the sender node to the receiver node, said packet recovery process comprising:
      a1) associating N number of scheduled times with N requests for retransmission of the transmitted packet to the sender node, said N scheduled times being relative to the satisfaction of the packet recovery condition, wherein at least one of the N scheduled times includes a receiver waiting time; and
      a2) at each scheduled time, transmitting a request for retransmission of the transmitted packet; and
   b) executing a packet retransmission process at the sender node only upon the first receipt of a request for retransmission of the transmitted packet; said packet retransmission process comprising:
      b1) using an erasure coding function, with integer parameter k greater than 1 and less than M, to generate M encoded blocks such that any k out of M encoded blocks are sufficient to recreate the transmitted packet at the receiver node;
      b2) associating M number of scheduled times with each one of the M encoded blocks to the receiver overlay node once, wherein at least one of the M scheduled times includes a sender waiting time; and
      b3) at each scheduled time, transmitting a corresponding one of the M encoded blocks to the receiver node;
   wherein the N and M are non-zero positive integers and M is greater than two.

52. The method of claim 51, wherein the packet recovery process is terminated upon receipt of the transmitted packet from the sender node.

53. The method of claim 51, wherein the packet recovery condition is satisfied based on detection of an out-of-order arrival of sequenced packets.

54. The method of claim 51, wherein the packet recovery condition is satisfied after the elapse of a wait period from a detection of an out-of-order arrival of sequenced packets.

55. The method of claim 54, wherein the wait period depends on a target deadline associated with the deadline driven criteria.

56. The method of claim 51, wherein a plurality of the M scheduled times have corresponding sender waiting times that are dependent on an underlying physical channel characteristics.

57. The method of claim 56, wherein the underlying physical channel characteristics relates to at least one of a measured transmission loss or a measured latency.

58. The method of claim 51, wherein at least one of a request for retransmission of the transmitted packet or a encoded block is transmitted over a physical link that is different from the physical link used for transmission of the transmitted packet.

59. The method of claim 51, wherein at least one of a request for retransmission of the transmitted packet and an encoded block are transmitted on different physical links.

60. The method of claim 51, wherein a plurality of requests for retransmissions of the transmitted packet are transmitted on different physical links.

61. The method of claim 51, wherein a plurality of encoded blocks are transmitted on different physical links.

62. The method of claim 51, wherein one or more of the M erasure encoded blocks associated with the same transmitted packet are transmitted from the sender node to the receiver node more than once.

63. The method of claim 51, wherein one or more of the M erasure encoded blocks associated with different transmitted packets are included in one network packet that is transmitted from the sender node to the receiver node.

64. The method of claim 51, wherein the IP node and the overlay node communicate over the Internet.

65. The method of claim 51, wherein the overlay network is a message oriented overlay network (MOON).

66. A method for transmitting packets over a last mile transmission medium of an IP access network between a node and an Access Overlay Router that communicates over both the last mile network and a second IP network, at least one of the IP node and the Access Overlay Router being a receiver node and the other being a sender node that is coupled to the receiver node, comprising:
   a) executing a packet recovery process at the receiver node upon satisfaction of a packet recovery condition that is associated with meeting a deadline driven criteria for a transmitted packet from the sender node to the receiver node, said packet recovery process comprising:
      a1) associating N number of scheduled times with N requests for retransmission of the transmitted packet to the sender node, said N scheduled times being relative to the satisfaction of the packet recovery condition, wherein at least one of the N scheduled times includes a receiver waiting time; and
      a2) at each scheduled time, transmitting a request for retransmission of the transmitted packet; and
   b) executing a packet retransmission process at the sender node only upon the first receipt of a request for retransmission of the transmitted packet; said packet retransmission process comprising:
      b1) using an erasure coding function, with integer parameter k greater than 1 and less than M, to generate M encoded blocks such that any k out of M encoded blocks are sufficient to recreate the transmitted packet at the receiver node;
      b2) associating M number of scheduled times with each one of the M encoded blocks to the receiver overlay node once, wherein at least one of the M scheduled times includes a sender waiting time; and
      b3) at each scheduled time, transmitting a corresponding one of the M encoded blocks to the receiver node;
   wherein the N and M are non-zero positive integers and M is greater than two.

67. The method of claim 66, wherein the packet recovery process is terminated upon receipt of the transmitted packet from the sender node.

68. The method of claim 66, wherein the packet recovery condition is satisfied based on detection of an out-of-order arrival of sequenced packets.

69. The method of claim 66, wherein the packet recovery condition is satisfied after the elapse of a wait period from a detection of an out-of-order arrival of sequenced packets.

70. The method of claim 69, wherein the wait period depends on a target deadline associated with the deadline driven criteria.

71. The method of claim 66, wherein a plurality of the M scheduled times have corresponding sender waiting times that are dependent on an underlying physical channel characteristics.

72. The method of claim 71, wherein the underlying physical channel characteristics relates to at least one of a measured transmission loss or a measured latency.

73. The method of claim 66, wherein at least one of a request for retransmission of the transmitted packet or a encoded block is transmitted over a physical link that is different from the physical link used for transmission of the transmitted packet.

74. The method of claim 66, wherein at least one of a request for retransmission of the transmitted packet and an encoded block are transmitted on different physical links.

75. The method of claim 66, wherein a plurality of requests for retransmissions of the transmitted packet are transmitted on different physical links.

76. The method of claim 66, wherein a plurality of encoded blocks are transmitted on different physical links.

77. The method of claim 66, wherein one or more of the M erasure encoded blocks associated with the same transmitted packet are transmitted from the sender node to the receiver node more than once.

78. The method of claim 66, wherein one or more of the M erasure encoded blocks associated with different transmitted packets are included in one network packet that is transmitted from the sender node to the receiver node.

* * * * *